United States Patent [19]

Sonobe

[11] Patent Number: 5,649,034
[45] Date of Patent: Jul. 15, 1997

[54] METHOD AND DEVICE FOR SMOOTHING AN ENLARGED IMAGE

[75] Inventor: Kenichi Sonobe, Kanagawa, Japan

[73] Assignee: Fuji Xerox Co., Ltd., Tokyo, Japan

[21] Appl. No.: 57,574

[22] Filed: May 6, 1993

[30] Foreign Application Priority Data

May 11, 1992 [JP] Japan .................................. 4-117418

[51] Int. Cl.⁶ ........................................ G06K 9/32
[52] U.S. Cl. ............................ 382/298; 382/257; 382/369
[58] Field of Search ........................ 382/47, 54, 254, 382/256, 257, 258, 260, 262, 264, 266, 267, 269, 293, 298, 300, 301, 308; 345/127, 130

[56] References Cited

U.S. PATENT DOCUMENTS

| | | | |
|---|---|---|---|
| 3,878,536 | 4/1975 | Gilliam | 340/324 |
| 4,129,860 | 12/1978 | Yonezawa et al. | 340/324 |
| 4,712,102 | 12/1987 | Troupes et al. | 340/790 |

FOREIGN PATENT DOCUMENTS 1-208154A   8/1989   Japan .

*Primary Examiner*—Leo Boudreau
*Assistant Examiner*—Phuoc Tran
*Attorney, Agent, or Firm*—Finnegan, Henderson, Farabow, Garrett & Dunner, L.L.P.

[57] ABSTRACT

In the enlarged image smoothing method and device, an original enlarged image obtained by enlarging an original image m times (m is an integral number which satisfies the condition that m≧2) in main and sub scanning directions is input, a first image is generated by moving the original enlarged image in a first direction, a second image is generated by moving the original enlarged image in a second direction opposite to the first direction, an AND operation is performed between the first image and second image, and an OR operation is performed between an image resulting from the AND operation and the original enlarged image, whereby the original enlarged image is smoothed.

10 Claims, 23 Drawing Sheets

FIG. 15
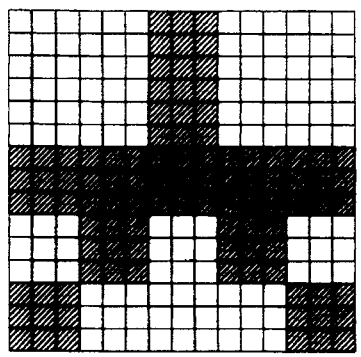
FONTORG
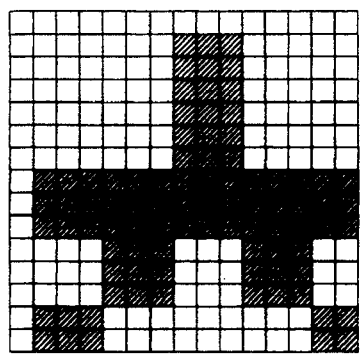
FONTORG(1,-1)
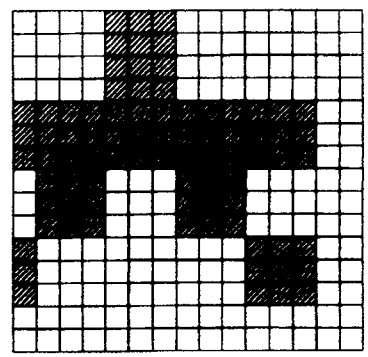
FONTORG(-2,2)
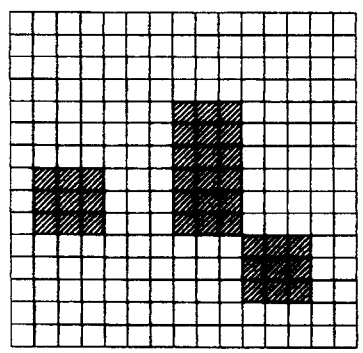
S21 WORK5←
FONTORG(1,-1) AND
FONTORG(-2,2)
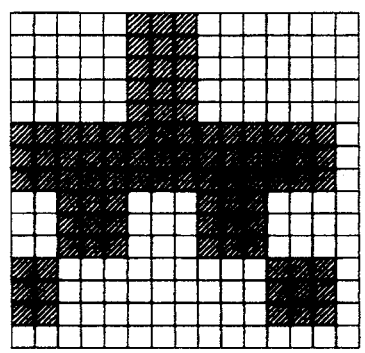
FONTORG(-1,1)
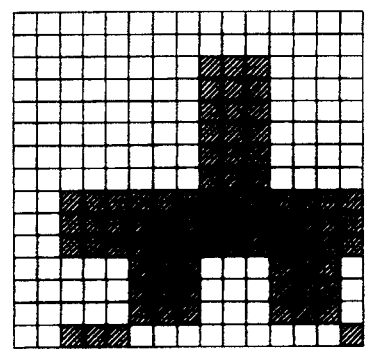
FONTORG(2,-2)
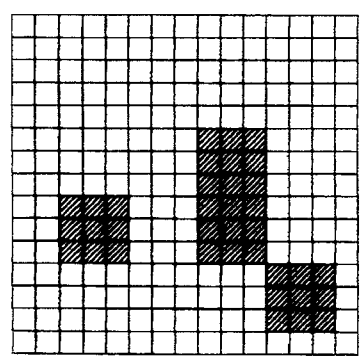
S22 WORK6←
FONTORG(-1,1) AND
FONTORG(2,-2)
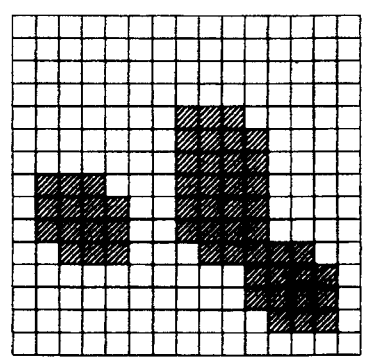
S23 WORK6←
WORK6 OR WORK5
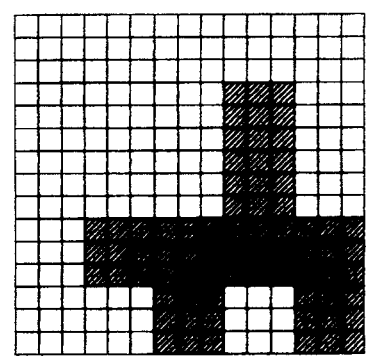
FONTORG(3,-3)

FIG. 16
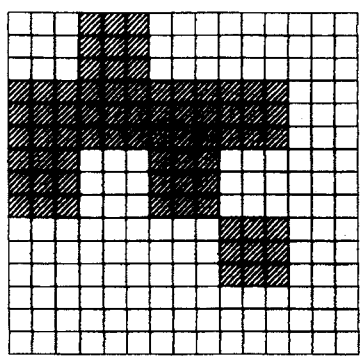
FONTORG (-3, 3)
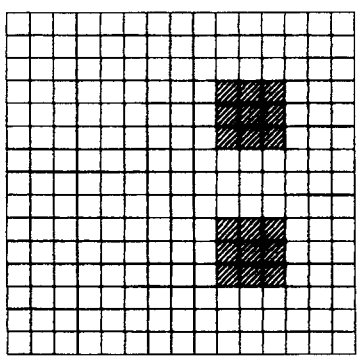
S24 WORK7←
FONTORG(3,-3) AND
FONTORG(-3, 3)
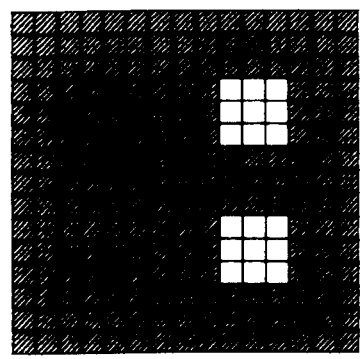
NOT (WORK7)
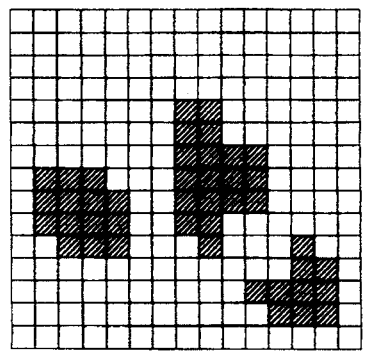
S25 WORK5←WORK6
AND NOT (WORK7)
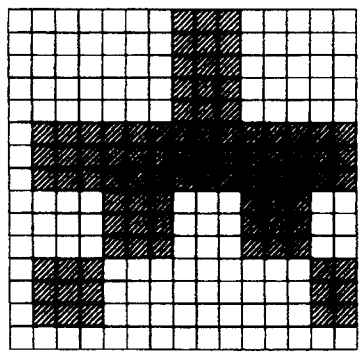
FONTORG (1, 1)
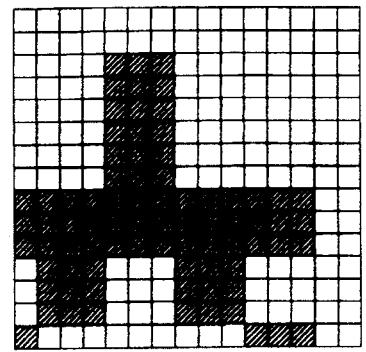
FONTORG (-2, -2)
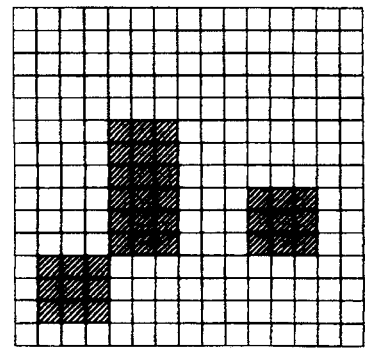
S26 WORK6←
FONTORG(1, 1) AND
FONTORG(-2, 2)
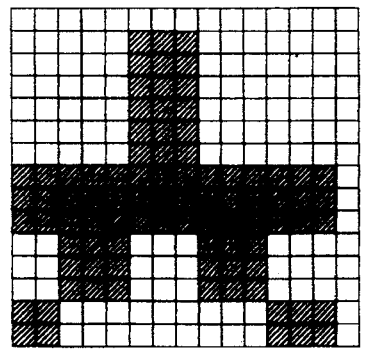
FONTORG (-1, -1)
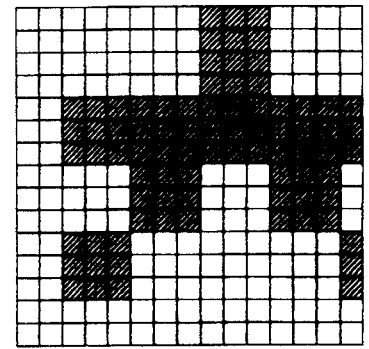
FONTORG (2, 2)

FIG. 17
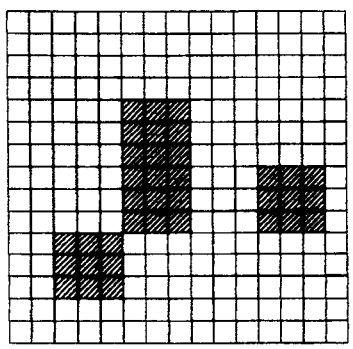
S27 WORK7←
FONTORG(-1,-1) AND
FONTORG(2, 2)
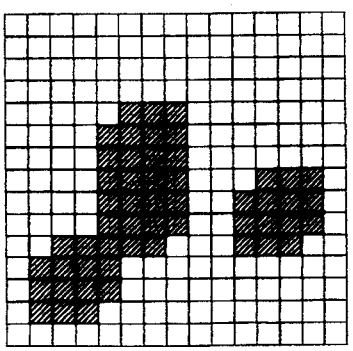
S28 WORK7←
WORK7 OR WORK6
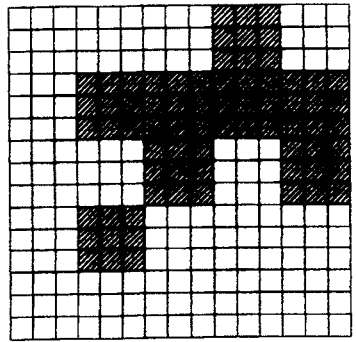
FONTORG(3, 3)
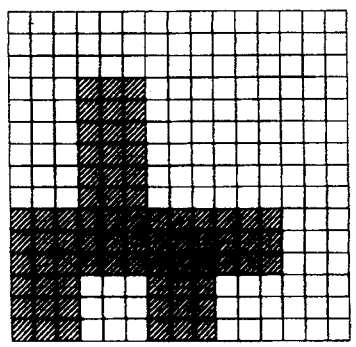
FONTORG(-3, -3)
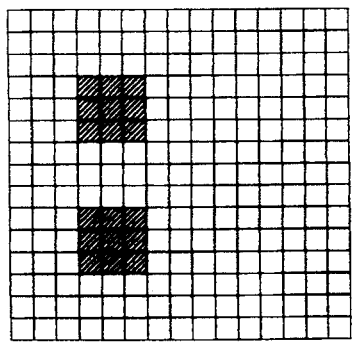
S29 WORK8←
FONTORG(3, 3) AND
FONTORG(-3, -3)
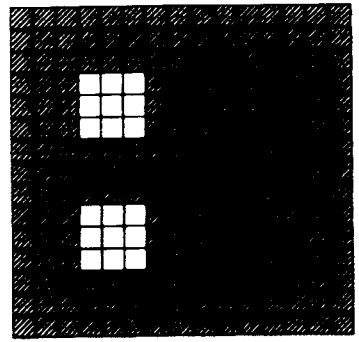
NOT(WORK8)
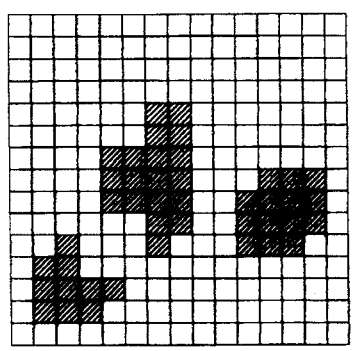
S30 WORK6←WORK7
AND NOT(WORK8)
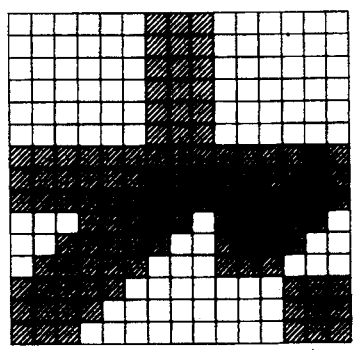
S31 FONTORG←
FONTORG OR WORK5
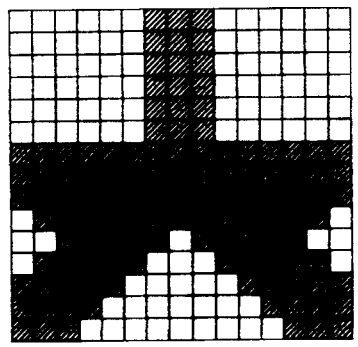
S32 FONTORG←
FONTORG OR WORK6

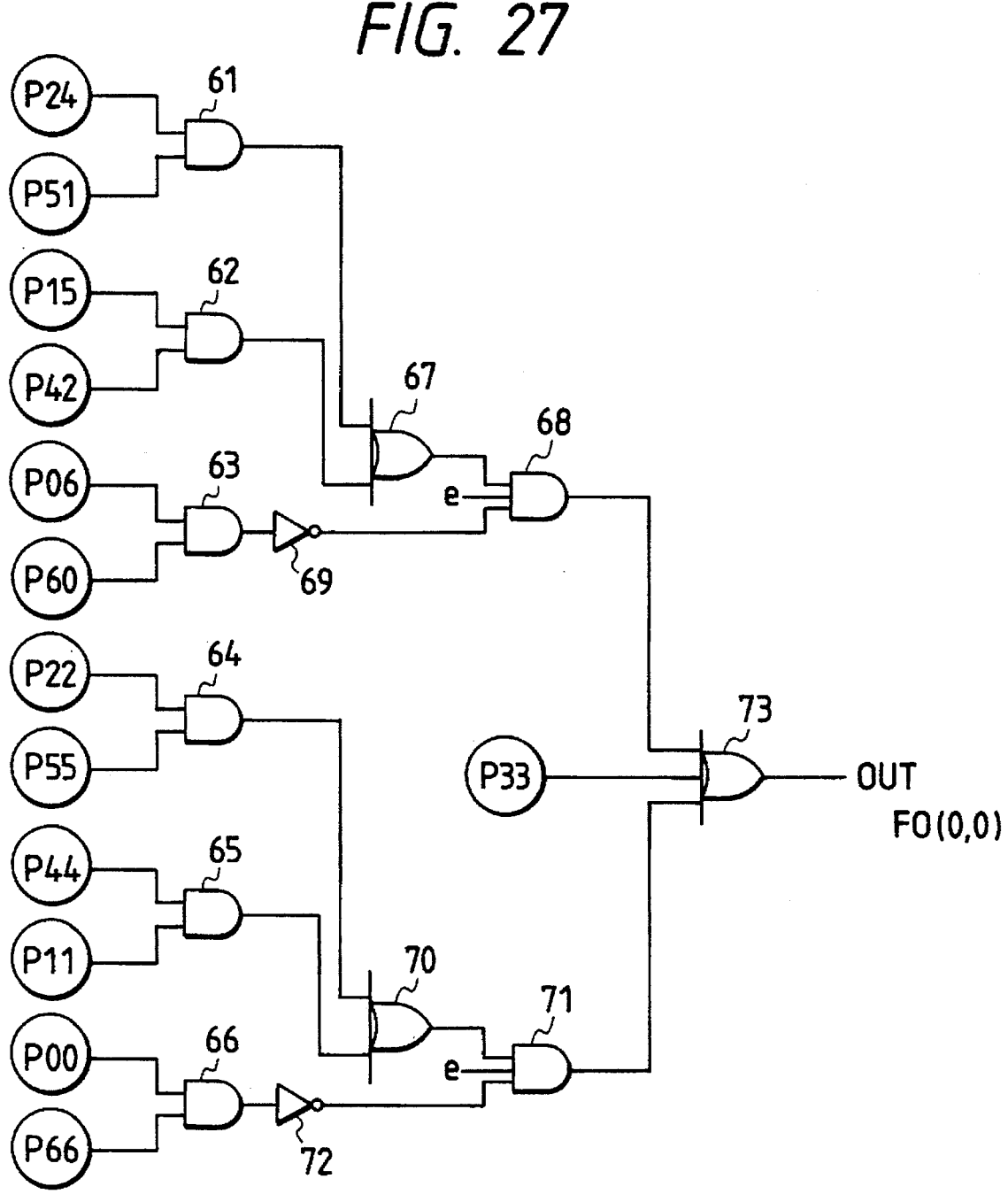

METHOD AND DEVICE FOR SMOOTHING AN ENLARGED IMAGE

BACKGROUND OF THE INVENTION

1. Field of the Invention

The present invention relates to method and device for smoothing enlarged characters and enlarged images for use in a printer, a graphic display and the like.

2. Description of the Related Art

For example, when outputting an enlarged character such as a twice enlarged character, a quadruply enlarged character and the like in a printer which expresses characters by means of fonts of a dot matrix type, the font of a standard character is enlarged to produce an enlarged font and characters are printed by use of the enlarged font. However, to simply enlarge the font of the standard character causes the contours of characters to be discontinuous outstandingly. Therefore, when outputting the enlarged font, the enlarged font is generally smoothed to thereby smooth the contour of the enlarged character. However, in the smoothing processing, the portions that are inherently to be right-angled must not be smoothed. Such need for smoothing exists not only in the enlarged character but also in an enlarged image such as a symbol, a figure and the like which are generated by enlarging an original bit map.

For example, in Japanese Patent Unexamined Publication No. Hei. 1-208154, there is disclosed an enlarged character smoothing method in which an enlarged character is smoothed while right-angled portions are left as it is.

According to the smoothing method disclosed in the above-mentioned publication, with respect to each of four diagonal directions, four points in the neighborhood of a character are compared with one another and dots are added to the enlarged character sequentially by use of a logical operation, thereby smoothing the oblique line portions of the enlarged character while the right-angled portions of the enlarged character are left as it is.

The smoothing method disclosed in the above publication is a method of smoothing an enlarged character with reference to the original character information, and a smoothing processing by use of a given dot pattern must be executed with respect to each of the four diagonal directions. This makes the smoothing processing complicated and it takes much time to perform the complicated smoothing processing when trying to realize the complicated smoothing processing by software.

Also, according to the above smoothing method, as the given dot pattern for use in the smoothing processing, different dot patterns must be prepared according to the enlarging magnifications of the characters, which makes it hard to smooth easily the enlarged characters that are enlarged by an arbitrary magnification or multiple number.

SUMMARY OF THE INVENTION

The present invention aims at eliminating the drawbacks found in the conventional smoothing methods. Accordingly, it is an object of the invention to provide enlarged character smoothing method and device which can perform a smoothing processing on an enlarged character at a high speed with a simple structure.

Also, it is another object of the invention to provide enlarged character smoothing method and device which can easily smooth the enlarged character that is enlarged by an arbitrary multiple number.

In attaining the above objects, the invention provides a method for smoothing an enlarged image, including the steps of inputting an original enlarged image obtained by enlarging an original image m times (m is an integral number which satisfies the condition that $m \geq 2$) in main and subsidiary scanning directions, moving the original enlarged image in a first direction along an inclined line formed by connecting adjoining pixels with one another to thereby generate a first image, moving the original enlarged image in a second direction opposite to the first direction along the inclined line to thereby generate a second image, performing an AND operation between the first and second images, and performing an OR operation between an image resulting from the AND operation and the original enlarged image.

BRIEF DESCRIPTION OF THE DRAWINGS

FIG. 15 is a first section of an explanatory view of changes in a bit map on the basis of the flow chart shown in FIG. 14;

FIG. 16 is a second section of the explanatory view of changes in the bit map on the basis of the flow chart shown in FIG. 14;

FIG. 17 is a third section of the explanatory view of changes in the bit map on the basis of the flow chart shown in FIG. 14;

FIG. 27 is a block diagram of a logical operation unit which performs a smoothing processing by use of a processing prohibition signal.

DETAILED DESCRIPTION OF THE PREFERRED EMBODIMENTS

First, the operation of the present invention will be described below by way of concrete examples.

In order to explain a smoothing processing, that is, a processing to smooth an oblique line, the following model is assumed.

Figure 1:
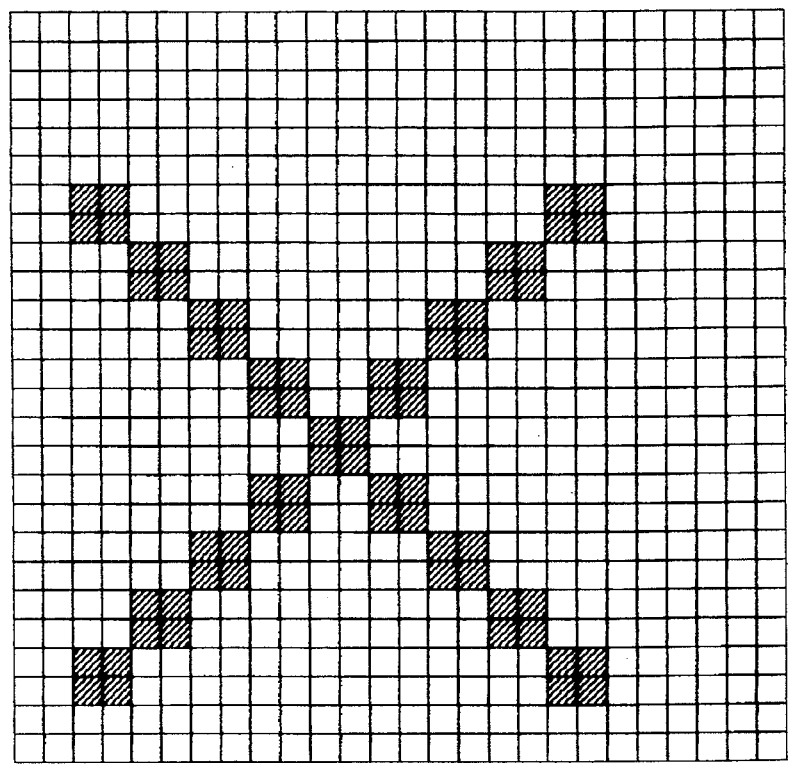
FIG. 1 is an explanatory view of a bit map of an enlarged character obtained by enlarging a bit map of a standard character twice in length and width.
Figure 2:
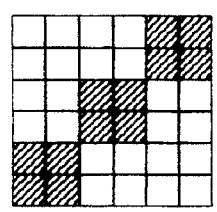
FIG. 2 is an explanatory, enlarged view of part of oblique lines.
Figure 3:
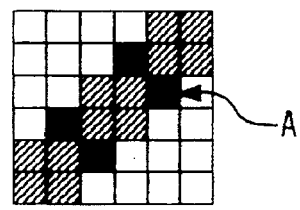
FIG. 3 is an explanatory view of a state in which the oblique lines are interpolated by means of addition of dots.

In FIG. 1, there is shown a bit map of an enlarged character obtained by enlarging a bit map of a standard character twice in length and width, that is, four times in area. Now, let us choose and examine oblique lines respectively having an angle of inclination of 45° extending upward to the right. In FIG. 2, parts of the oblique lines are shown enlargedly. To smooth the oblique lines, as shown in FIG. 3, dots may be added to interpolate the oblique lines, with the result that there can be obtained oblique lines which are seen smooth.

Figure 4:
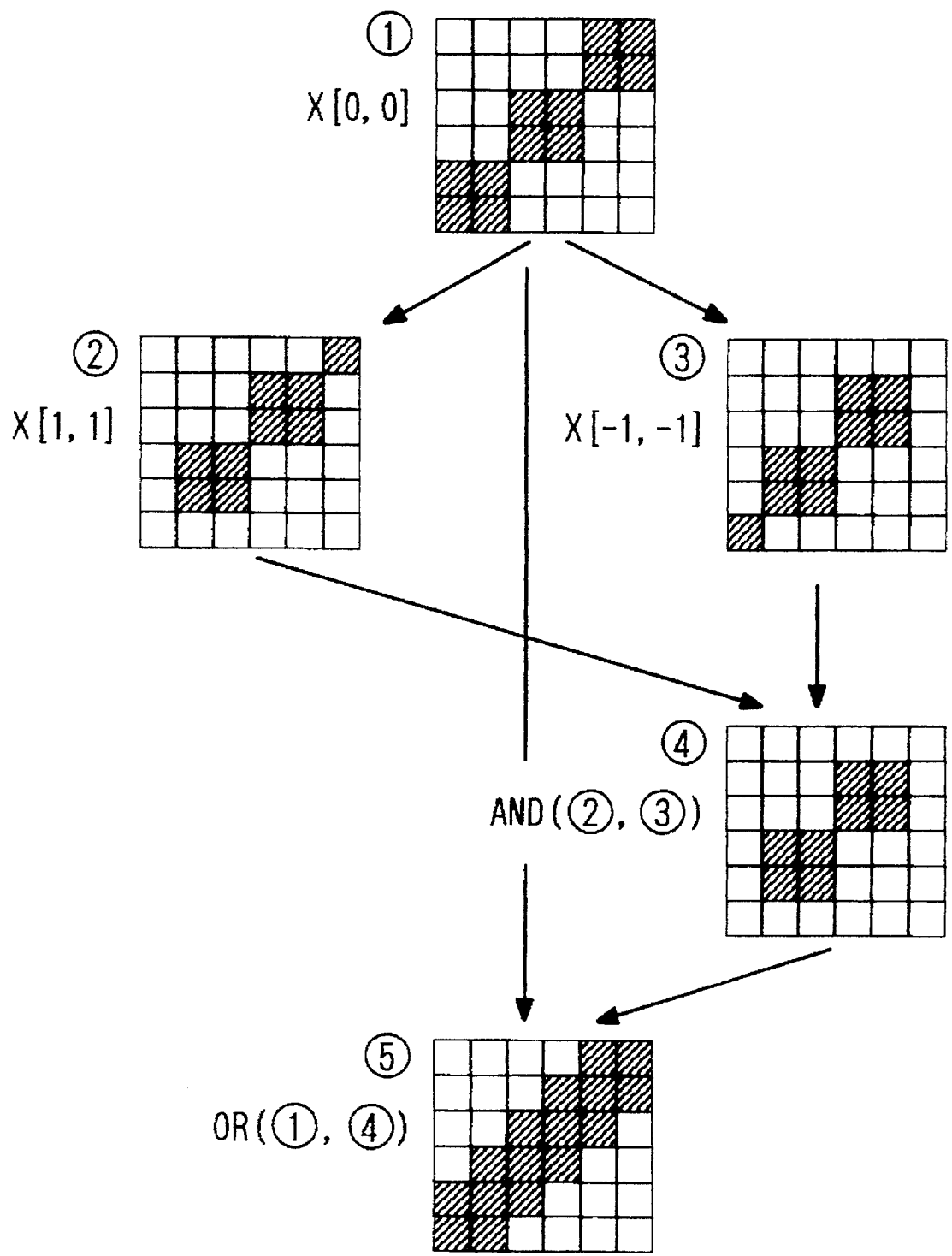
FIG. 4 is an explanatory view of a procedure of a smoothing processing on oblique lines extending upward to the right.

The procedure of the smoothing processing will be described below with reference to FIG. 4.

From a bit map (1) of an original enlarged character having reference coordinates of X [0, 0], there can be produced a bit map (2) which is moved 1 dot upward to the right, that is, having reference coordinates of X [1, 1], and a bit map (3) which is moved 1 dot downward to the left, that is, having reference coordinates of X [−1, −1]. Then, the bit maps (2) and (3) are ANDed to thereby produce a bit map (4), and further the bit map (4) and the original bit map (1) are ORed to thereby produce a bit map (5) in which a portion A is interpolated. As a result of this, the oblique lines extending upward to the right included in the enlarged character can be smoothed.

Figure 5:
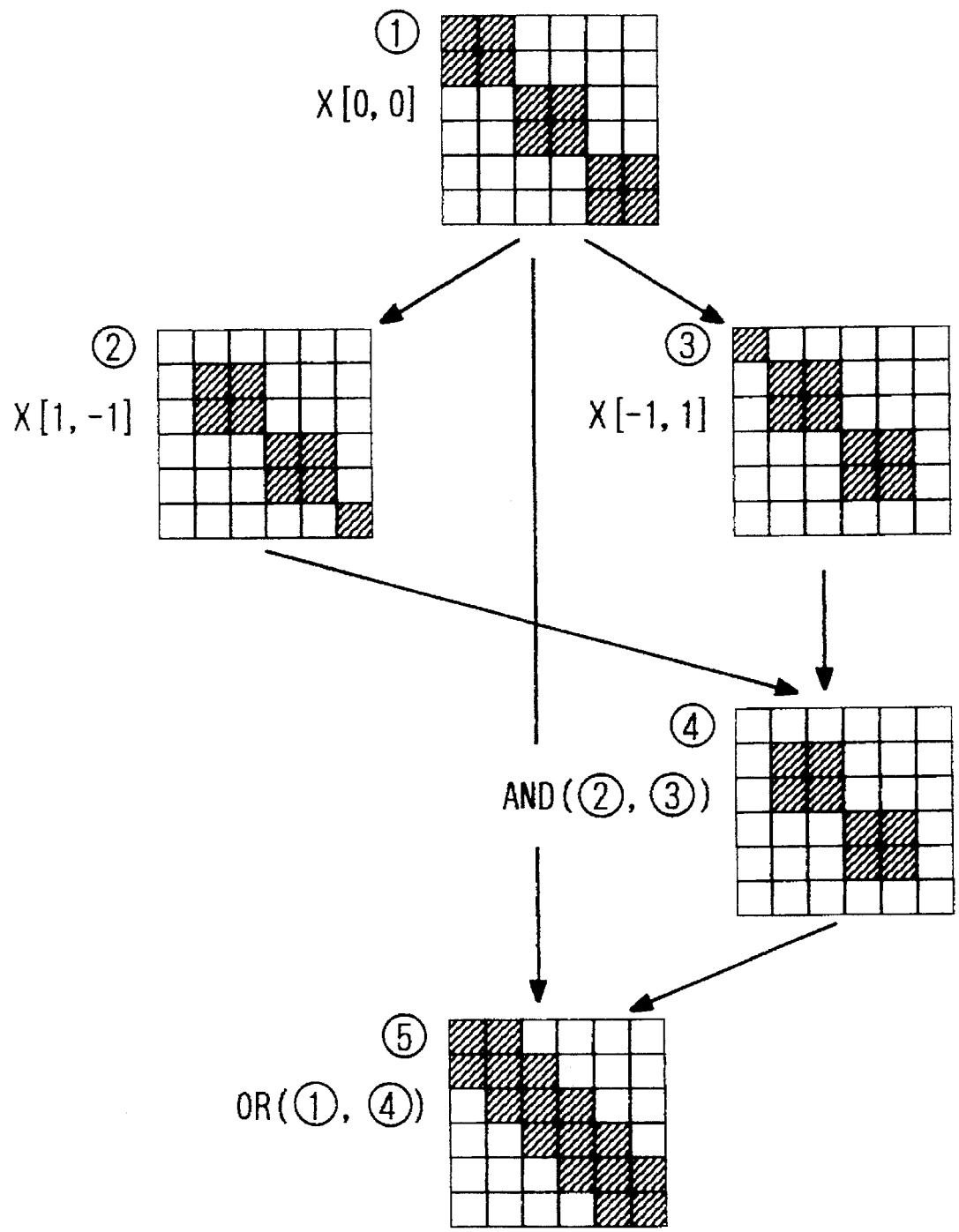
FIG. 5 is an explanatory view of a procedure of a smoothing processing on oblique lines extending upward to the left.

The above-mentioned smoothing processing is applied only to the oblique lines extending upward to the right, but is not applied to the oblique lines which extend upward to the left. Then, a processing shown in FIG. 5 is performed on the oblique lines extending upward to the left. That is, the original bit map (1) is moved 1 dot downward to the right to thereby produce a bit map (2) and is moved upward 1 dot to the left to thereby produce a bit map (3), then the bit maps (2) and (3) are ANDed to thereby produce a bit map (4), and further the bit map (4) and the original bit map (1) are ORed to thereby produce an interpolated bit map (5). This processing can smooth the oblique lines extending upward to the left included in the enlarged character.

Figure 6:
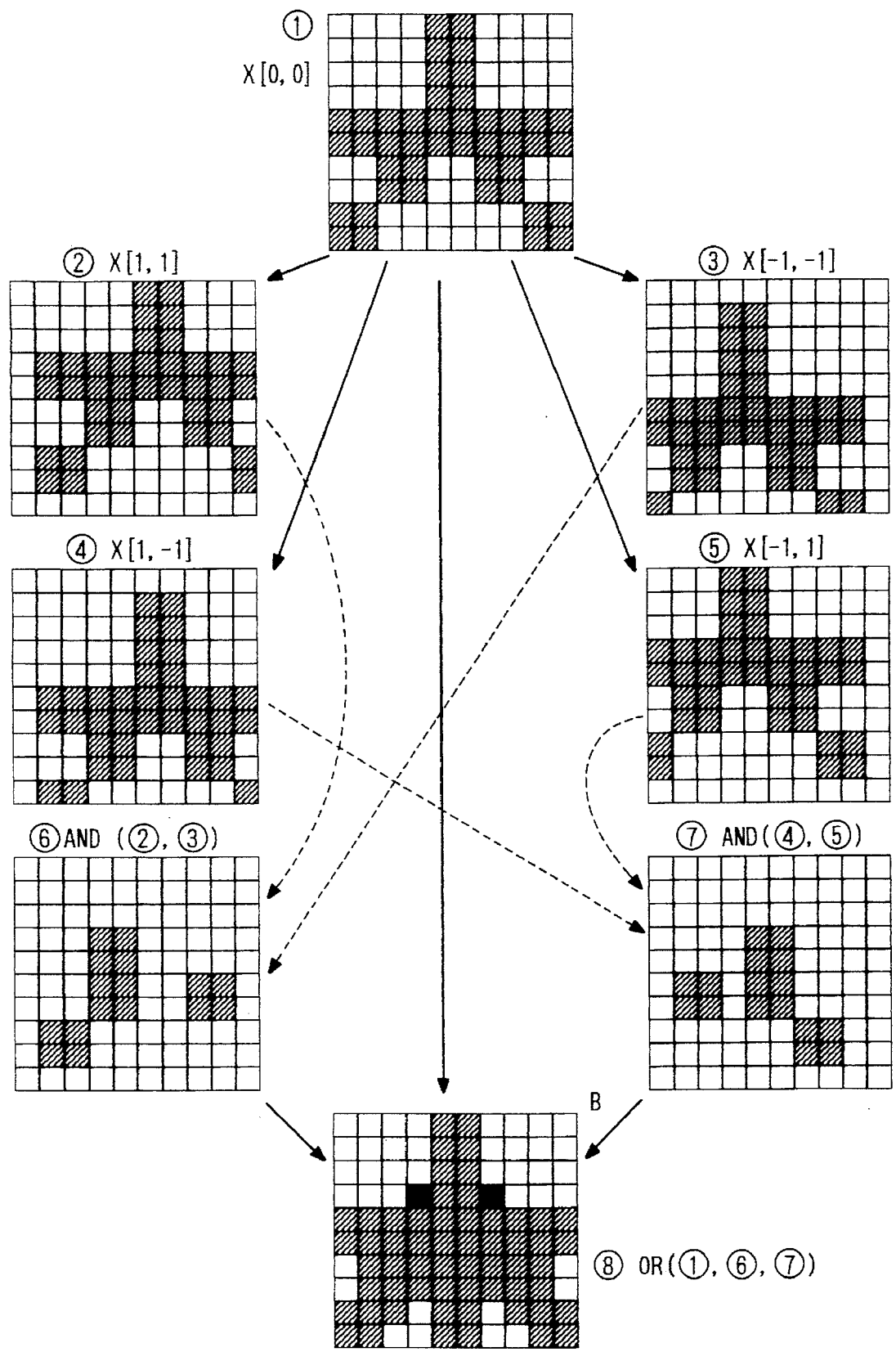
FIG. 6 is an explanatory view of a case in which smoothing processings are performed on oblique lines included in the two directions.

Now, FIG. 6 shows a case in which the smoothing processing on the oblique lines extending upward to the right described above with reference to FIG. 4 and the smoothing processing on the oblique lines extending upward to the left described above with reference to FIG. 5 are both performed. The original bit map (1) is moved 1 dot upward to the right, downward to the left, downward to the right and upward to the left, respectively, to thereby produce bit maps (2), (3), (4), and (5), respectively. Then, the bit maps (2) and (3) are ANDed to thereby produce a bit map (6), the bit maps (4) and (5) are ANDed to thereby produce a bit map (7), and the bit maps (1), (6) and (7) are ORed to thereby smooth the oblique lines inclined in both directions.

With respect to the above-mentioned smoothing processing, special attention should be paid to the fact that the smoothing processing on the oblique lines extending upward to the right described with reference to FIG. 4 and the smoothing processing on the oblique lines extending upward to the left described with reference to FIG. 5 have no influence on each other. That is, the dots to be added for interpolation of the oblique lines extending upward to the right are all included in the original bit map except for the points thereof to be used for interpolation of the oblique lines extending upward to the right, so that the dots have no effect on the processing to be performed on the oblique lines extending upward to the left. Similarly, the dots to be added for interpolation of the oblique lines extending upward to the left have no effect on the processing to be performed on the oblique lines extending upward to the right.

According to the above-mentioned smoothing processing, the oblique lines can be interpolated regardless of the inclining directions thereof. However, as shown in a bit map (8) in FIG. 6, the dots are added to a portion B which is inherently to be right-angled, incurring a possibility that the cleat shape of the character can be lost.

Figure 7:
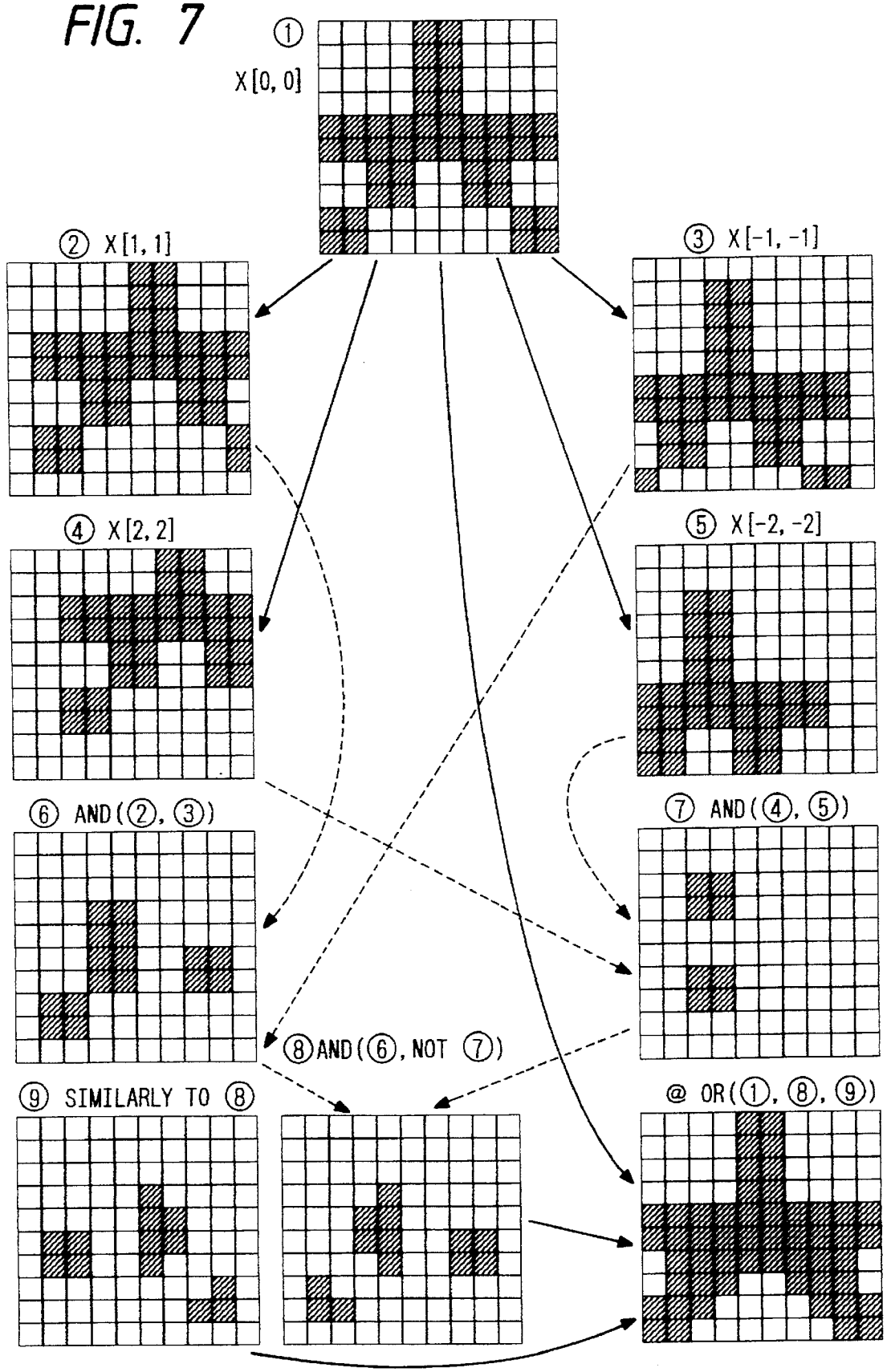
FIG. 7 is an explanatory view of a smoothing processing which can leave an right-angled portion as it is.

In view of this, it is necessary to perform the smoothing processing in such a manner that the oblique lines can be interpolated while the right-angled portion is left as it is. FIG. 7 is a view to show a smoothing processing which can leave the right-angled portion as it is.

With respect to the smoothing of oblique lines extending upward to the right, the original bit map (1) is moved 1 dot upward to the right and downward to the left respectively to thereby produce bit maps (2) and (3), while the original bit map (1) is moved 2 dots upward to the right and downward to the left respectively to thereby produce bit maps (4) and (5). Then, the bit maps (2) and (3) are ANDed to thereby provide a bit map (6), the bit maps (4) and (5) are ANDed to thereby provide a bit map (7), and the bit maps (6) and (7) are NOT-ORed to thereby provide a bit map (8). Also, with respect to the smoothing of oblique lines extending upward to the left as well, a similar processing is performed to thereby provide a bit map (9). After then, the bit maps (1), (8) and (9) are ORed to thereby provide a bit map (a) in which the oblique lines in the two inclining directions are both smoothed.

According to the smoothing processing shown in FIG. 7, as can be clearly understood from the bit map (a), the oblique lines in the two inclining directions can be interpolated while the right-angled portions are left as they are.

Now, description will be hereinbelow given concretely of the characteristics of the invention on the basis of the embodiments thereof with reference to the accompanying drawings.

Figure 8:
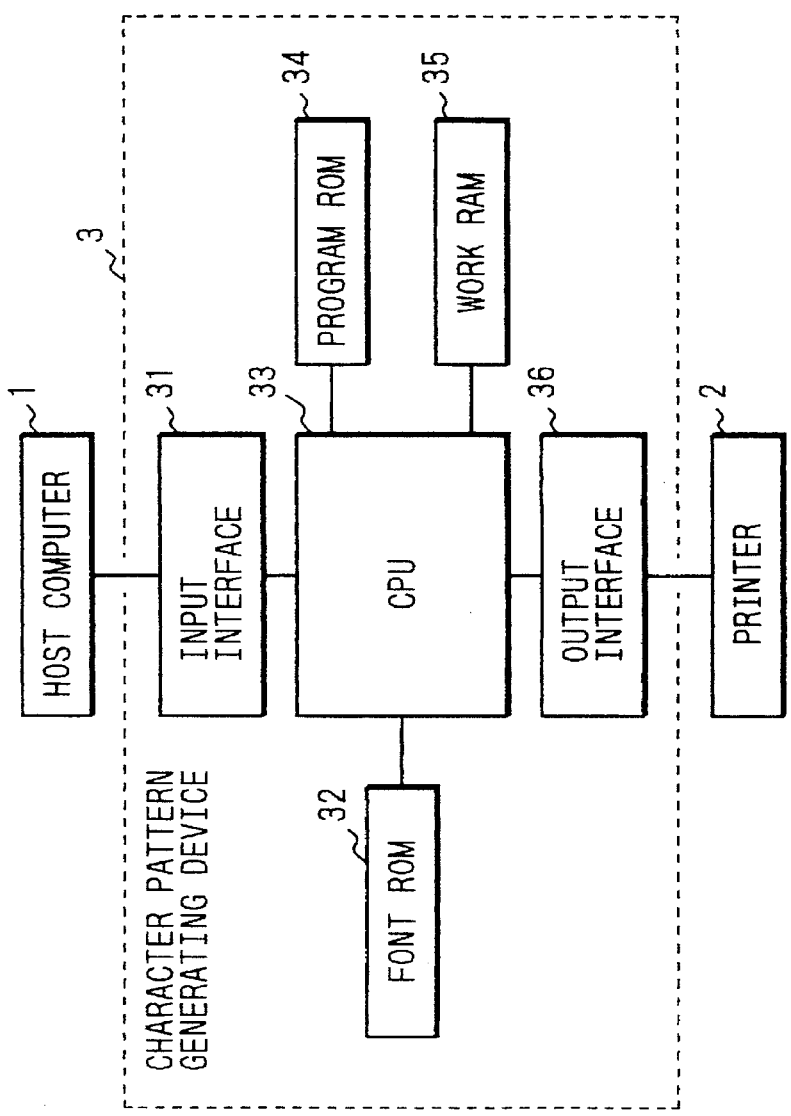
FIG. 8 is a block diagram of a system used to enforce an enlarged character smoothing method according to the invention.

In FIG. 8, there is shown a block diagram of a system used to enforce an enlarged character smoothing method according to the invention. A host computer 1 sends to a character pattern generating device 3 printing data such as a character code corresponding to a character to be output by a printer 2, a magnification or multiple number, and other data. The character pattern generating device 3 includes an input interface 31 for receiving the printing data from the host computer 1, a font ROM (Read Only Memory) 32 in which a font of a dot matrix type representing the shape of a character is stored, a CPU 33 which reads out from the font ROM 32 the bit map data of the font corresponding to the character code input, enlarges a bit map according to the magnification specified and performs a smoothing processing on the enlarged bit map, a program ROM 34 in which a program to be executed by the CPU 33 is stored, a work RAM (Random Access Memory) 35 which is used as an operation area when the program is executed, and an output interface 36 which outputs the data on the enlarged bit map to the printer 2.

Figure 9:
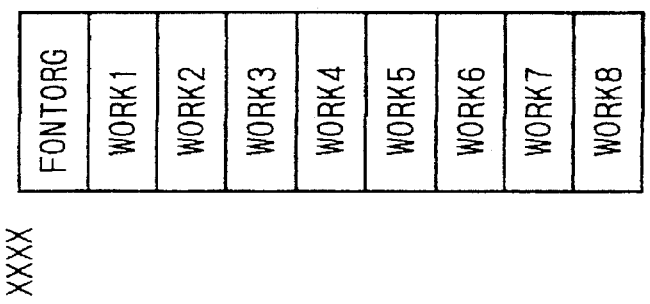
FIG. 9 is an explanatory view of the operation areas of a work RAM.

In the work RAM 35, as shown in FIG. 9, there are secured FONTORG and WORK1 to WORK8 as operation areas. In FIG. 9, XXXX represents a start address of the operation areas.

Figure 10:
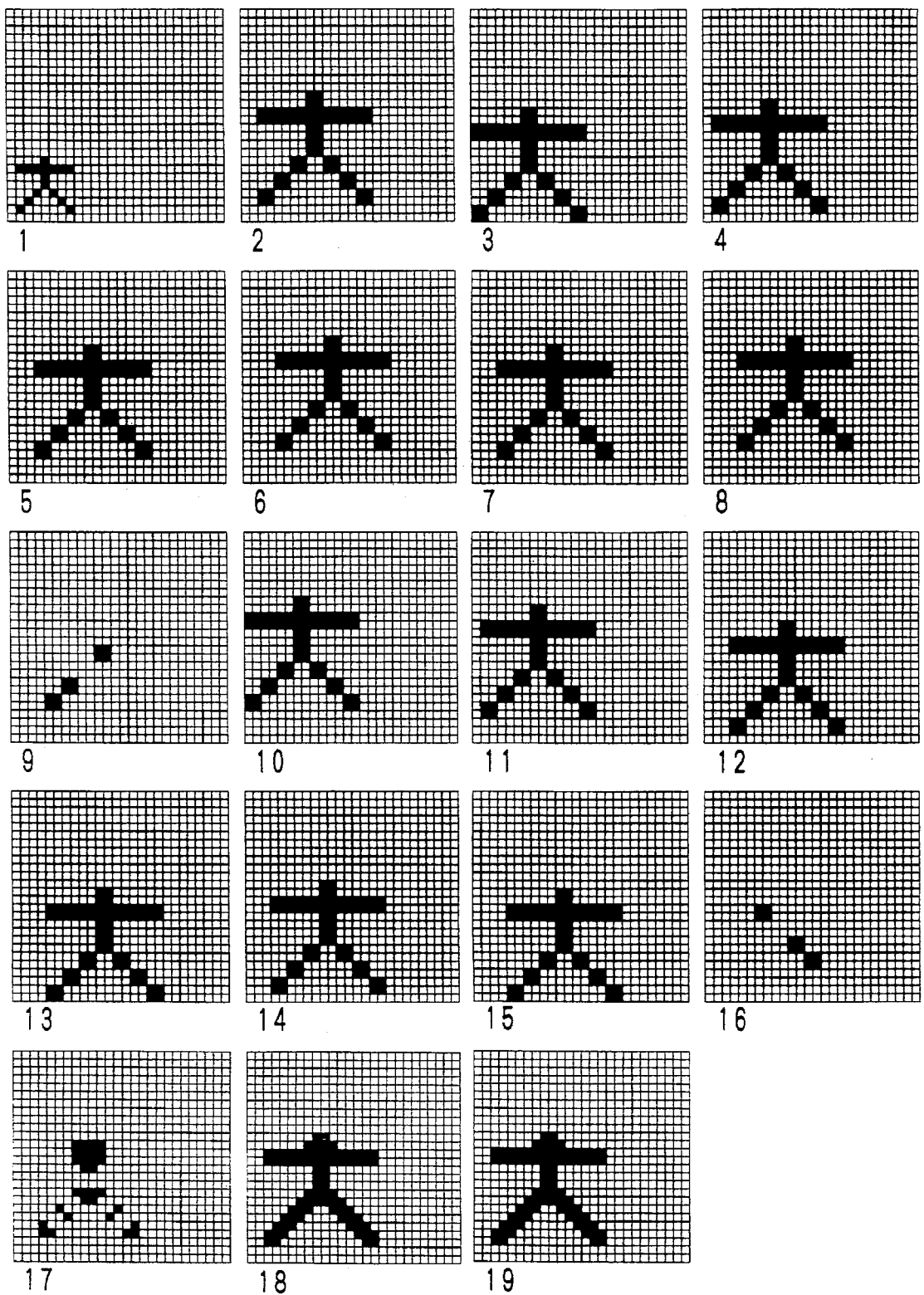
FIG. 10 is an explanatory view of changes in a bit map when a smoothing processing is performed.

Next, description will be given below of a smoothing processing to be performed in the character pattern generating device 3 with reference to a bit map shown in FIG. 10. For reference, numerals 1 to 19 shown in FIG. 10 correspond to numerals within parentheses representing the following steps, respectively. Here, the description will be given by way of a case in which the bit map is enlarged twice in length and width.

(1) Bit map data serving as original bit map data are prepared in FONTORG.

Concretely, when the printing data are transmitted from the host computer 1 to the character pattern generating device 3, then the CPU 33 reads out from the font ROM 32 the bit map data of a font corresponding to a character code included in the printing data and then transfers the same to the operation area FONTORG of the work RAM 35. In this manner, the bit map data serving as the original data for processing is stored in the operation area FONTORG. Here, it is assumed that the CPU 33 also controls the operations that are involved with the following processings.

(2) The data of FONTORG is enlarged twice in length and width and is then stored in FONTORG.

(3) With the data of FONTORG as the original data, the FONTORG data is moved by two dots downward to the left to thereby provide a bit map, and the bit map is then stored in WORK1.

(4) With the data of FONTORG as the original data, the FONTORG data is moved by 1 dot downward to the left to thereby provide a bit map, and the bit map is then stored in WORK2.

(5) With the data of FONTORG as the original data, the FONTORG data is moved by 1 dot upward to the right to thereby provide a bit map, and the bit map is then stored in WORK3.

(6) With the data of FONTORG as the original data, the FONTORG data is moved by 2 dots upward to the right to thereby provide a bit map, and the bit map is then stored in WORK4.

(7) The data of WORK2 and WORK3 are ANDed and the result thereof is then stored in WORK5.

(8) The data of WORK1 and WORK4 are ANDed and the result thereof is then stored in WORK6.

(9) The data of WORK6 is inverted, that is, the data of WORK6 is NOTed, the inverted data and the data of WORK5 are ANDed, and the result thereof is then stored in WORK7.

(10) With the data of FONTORG as the original data, the FONTORG data is moved by 2 dots upward to the left to thereby provide a bit map, and the bit map is then stored in WORK1.

(11) With the data of FONTORG as the original data, the FONTORG data is moved by 1 dot upward to the left to thereby provide a bit map, and the bit map is then stored in WORK2.

(12) With the data of FONTORG as the original data, the FONTORG data is moved by 1 dot downward to the right to thereby provide a bit map, and the bit map is then stored in WORK3.

(13) With the data of FONTORG as the original data, the FONTORG data is moved by 2 dots downward to the right to thereby provide a bit map, and the bit map is then stored in WORK4.

(14) The data of WORK2 and WORK3 are ANDed and the result thereof is then stored in WORK5.

(15) The data of WORK1 and WORK4 are ANDed and the result thereof is then stored in WORK6.

(16) The data of WORK6 is inverted, that is, the data of WORK6 is NOTed, the inverted data and the data of WORK5 are ANDed, and the result thereof is then stored in WORk 6.

(17) The data of WORK7 and WORK6 are ORed, and the result thereof is then stored in WORK7.

(18) The data of WORK7 and FONTORG are ORed, and the result thereof is then stored in FONTORG.

(19) The data of FONTORG is smoothed.

As described above, the smoothing of the enlarged character can be simply achieved by using the image that is shifted by 1 dot. Further, the angled-portion can be kept as it is by prohibiting the smoothing thereof by use of the image that is shifted by 2 dots. Also, the image in the prohibit area may be removed from the image obtained by smoothing, and these processings can be performed individually.

Figure 12:
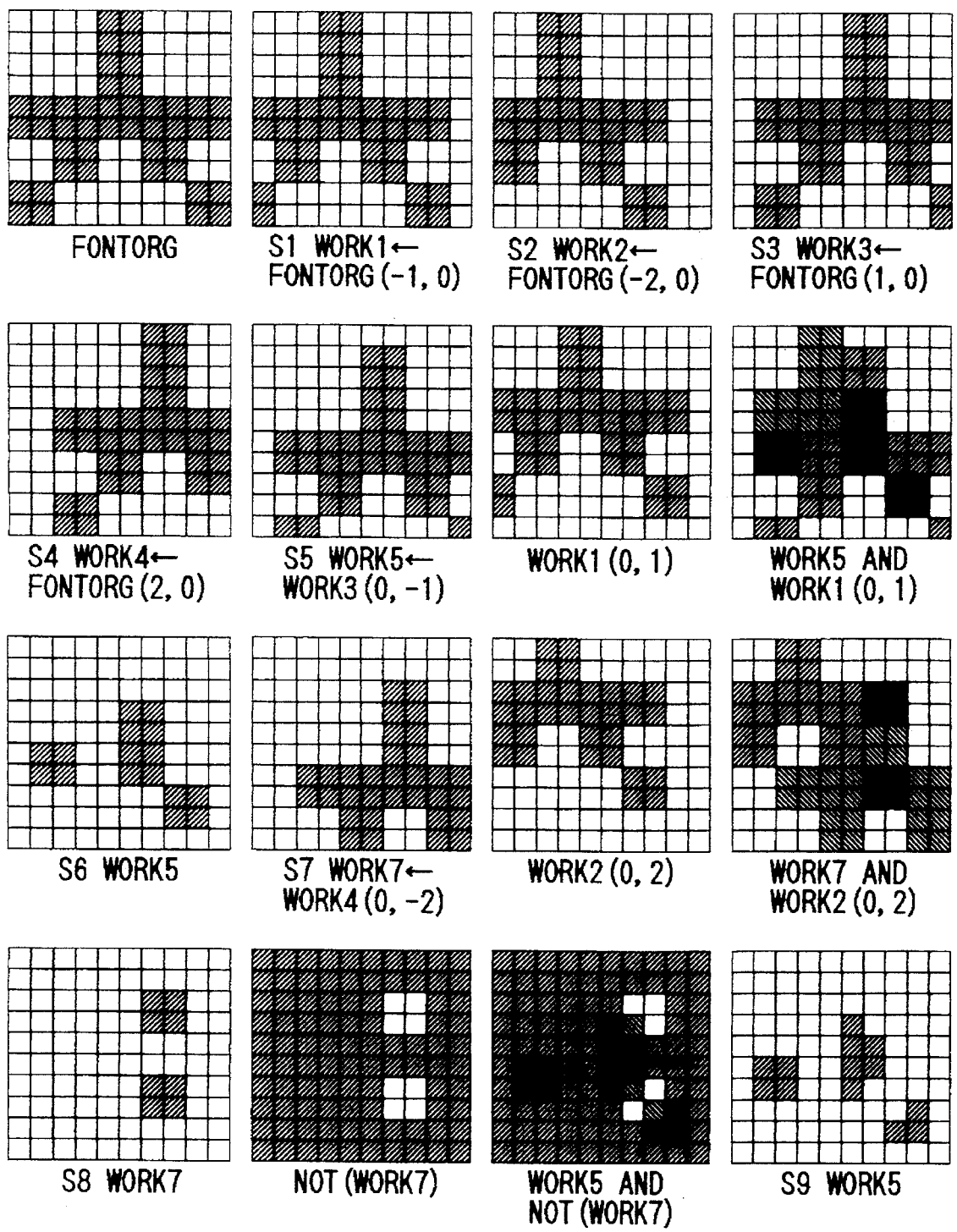
FIG. 12 is a first section of an explanatory view of changes in a bit map on the basis of the flow chart shown in FIG. 11.
Figure 13:
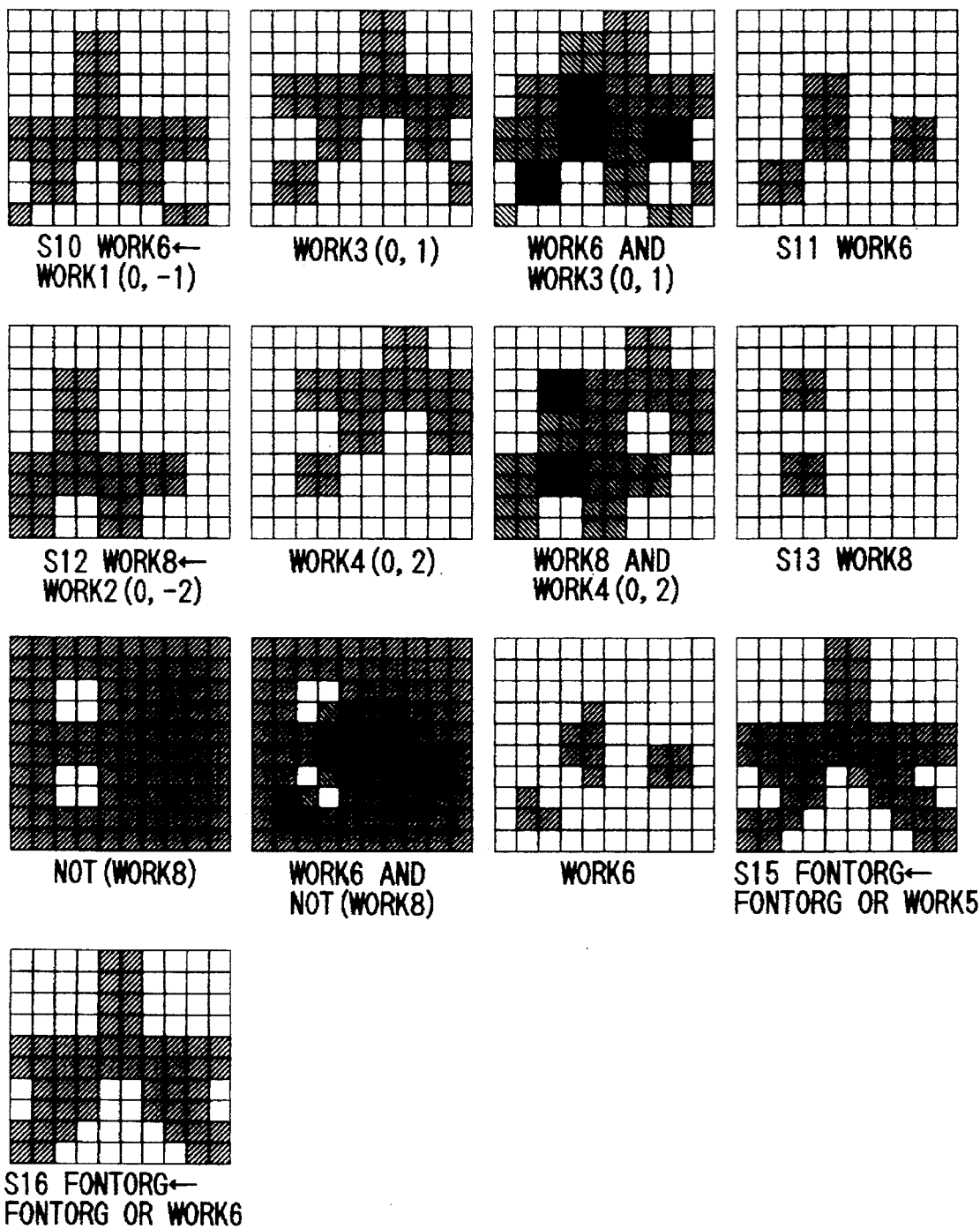
FIG. 13 is a second section of the explanatory view of changes in the bit map on the basis of the flow chart shown in FIG. 11.

Next, description will be given below of another embodiment for smoothing an enlarged character which is enlarged twice in length and width with reference to a flow chart shown in FIG. 11 and bit maps respectively shown in FIGS. 12 and 13. Here, reference characters S1 to S16 shown in FIGS. 12 and 13 respectively correspond to reference characters which represent steps shown in the flow chart shown in FIG. 11.

Figure 11:
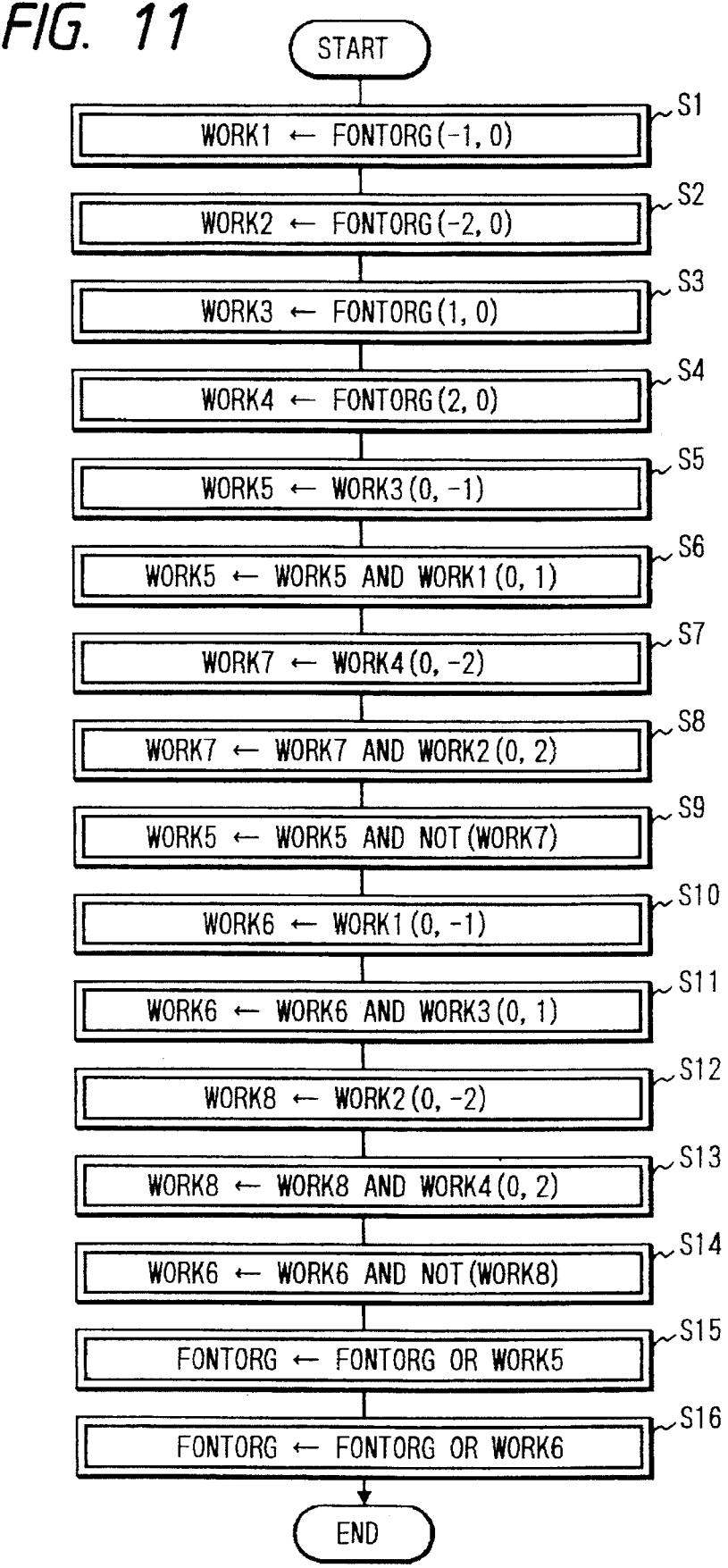
FIG. 11 is a flow chart of a processing for smoothing an enlarged character which is enlarged twice in length and width.

A smoothing processing in accordance with the flow chart shown in FIG. 11 is similar to the smoothing processing previously described with reference to FIG. 10 and can be easily understood from changes in bit maps shown in FIG. 12 and, therefore, the detailed description thereof is omitted here. In the flow chart shown in FIG. 11, for example, WORK1←FONTORG (−1, 0) in Step S1 means that, with the data of FONTORG as the original data, the FONTORG data is moved by 1 dot to the left to thereby provide a bit map and the bit map is stored in WORK1. Also, WORK5←WORK5 AND WORK1 (0, 1) in Step S6 means that the data of WORK5 and the data obtained by moving the data of WORK1 upward by 1 dot are ANDed and the result thereof is stored in WORK5. This applies similarly in other steps.

Figure 14:
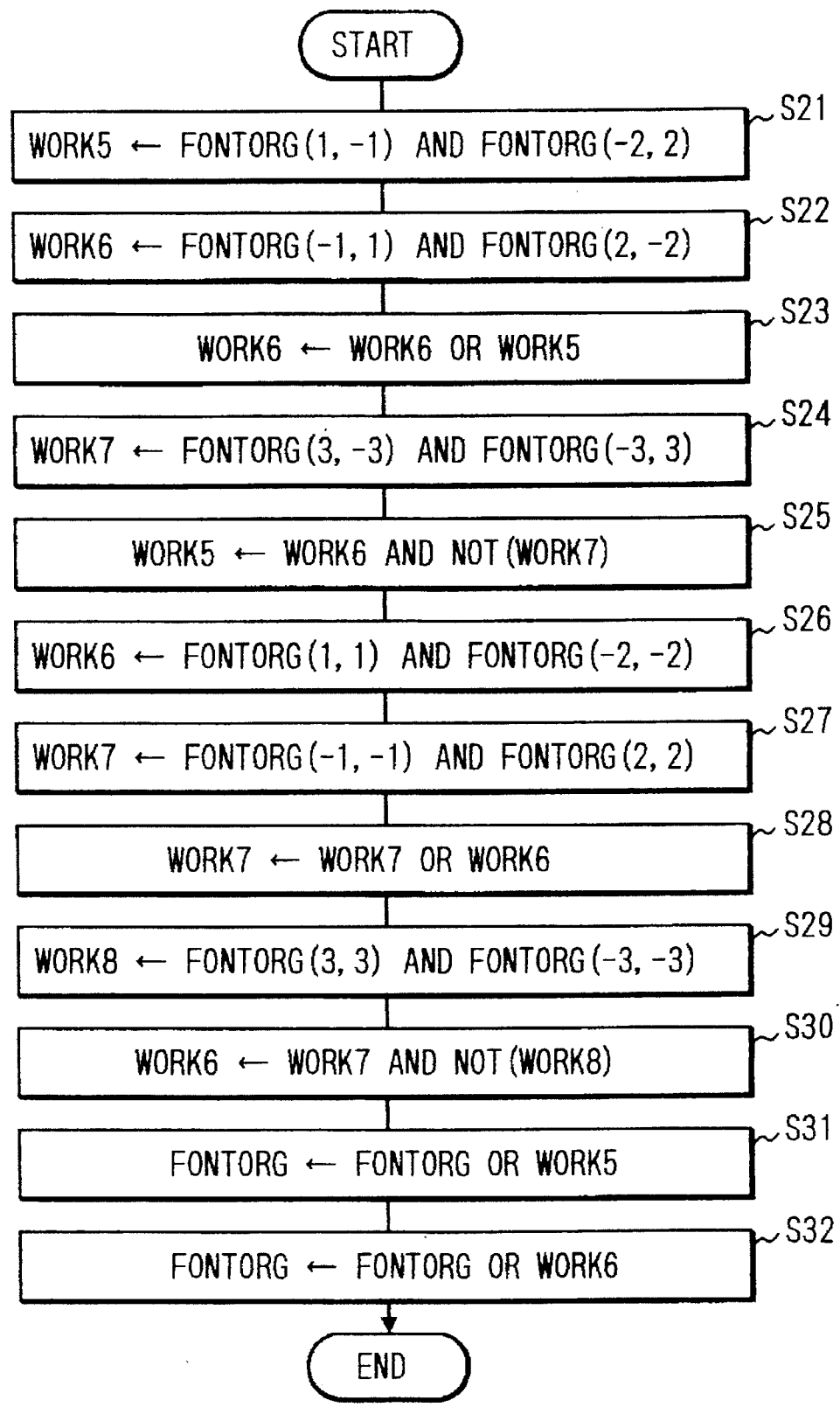
FIG. 14 is a flow chart of a processing for smoothing an enlarged character which is enlarged three times in length and width.

Next, a processing or smoothing of an enlarged character which is enlarged three times in length and width is shown in a flow chart in FIG. 14 and in bit maps respectively shown in FIGS. 15 to 17. Here, reference characters S21 to S32 shown in FIG. 15 to 17 correspond to reference characters designating steps shown in the flow chart in FIG. 14, respectively.

The processing for smoothing an enlarged character which is enlarged three times in length and width is also similar to the processing for smoothing an enlarged character which is enlarged twice in length and width. That is, with the data of FONTORG as the original data, the FONTORG data is moved by 1 dot upward to the left, downward to the right, downward to the left and upward to the right respectively to thereby provide bit maps, and is moved by 2 dots in these directions respectively to hereby provide bit maps, and logical operations are performed between these bit maps, whereby the oblique lines can be smoothed while the right-angled portions are kept as they are.

In the foregoing description, there have been described the smoothing processings on the enlarged characters which are enlarged twice and three times in length and width respectively. However, the present invention can also be applied to a processing for smoothing an enlarged character which is enlarged by an arbitrary multiple number in length and width.

Figure 18:
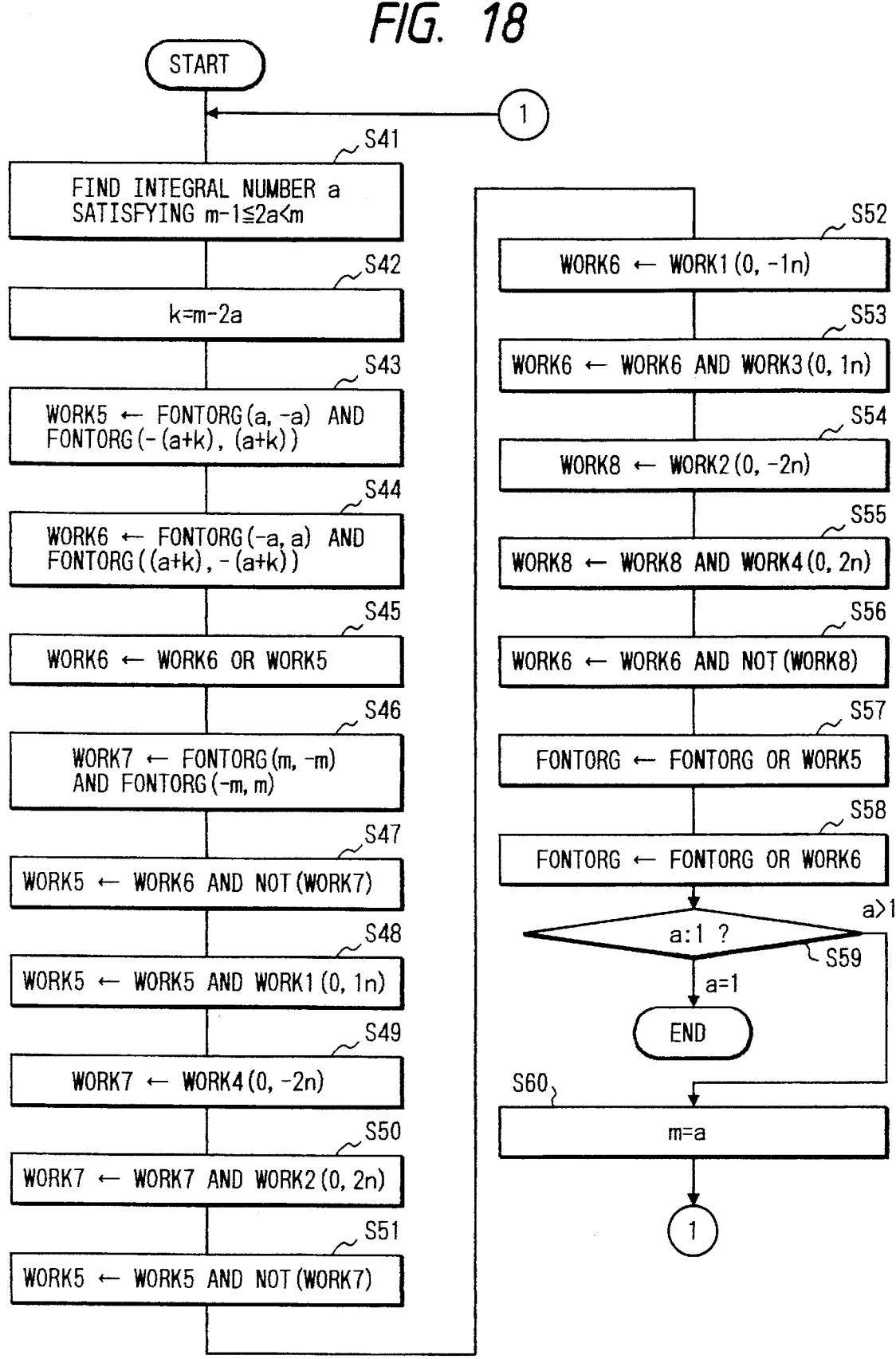
FIG. 18 is a flow chart of a processing for smoothing an enlarged character which is enlarged by a multiple number m in length and width.

FIG. 18 is a flow chart which shows a smoothing processing on an enlarged character which is enlarged by a multiple number m in length and width. However, m is an integral number which satisfies $m \geq 2$, and, a, k are respectively integral numbers which satisfy $m-1 \leq 2a \leq m$, $k=m-2a$, respectively. In Table 1, there is shown a relationship between m and a, k when m is 1 to 7.

TABLE 1

| m | a | k |
|---|---|---|
| 2 | 1 | 0 |
| 3 | 1 | 1 |
| 4 | 2 | 0 |
| 5 | 2 | 1 |
| 6 | 3 | 0 |
| 7 | 3 | 1 |

In FIG. 18, there is shown a flow chart which includes Steps S41 to S60 and Steps S43 to S58 respectively correspond to Steps S21 to S32 of the flow chart shown in FIG. 14 for the smoothing processing on the enlarged character which is enlarged three times in length and width, while the amount of movement of the dot is multiplied by the number a.

In the flow chart shown in FIG. 18, for example, when a smoothing processing is performed on an enlarged character which is enlarged five times in length and width, at first, a smoothing processing is performed on the enlarged character under the condition that m=5, a=2 and k=1 and, next, another smoothing processing is performed again on the data resulting from the first smoothing processing under the condition that m=2, a=1 and k=0, whereby a finally smoothed bit map can be obtained.

In order words, when m=5, then in Step S41 a=2 is obtained and in Step S42 k=1 is obtained, and in Steps S43 to S58 the first smoothing processing is performed with m=5, a=2 and k=1. In this operation, because of a=2>1, the processing advances from Step S59 to Step S60 in which m=2 is selected, and thus the processing goes back to Step S41. For this reason, the second smoothing processing is performed under the condition that m=2, a=1 and k=0. In this operation, because of a=1, the processing is ended.

Here, if the multiple number or factor m is even, then k=0 is obtained, so that processings of terms including k can be omitted and the flow of the processings may be changed according to the value of m. Also, terms including m are used to keep the right-angled portions and, for this reason, they can be omitted when there is no need to keep the right-angled portions.

As described above, the smoothing of a character of a high multiple number can be carried out recurrently, so that the smoothing up to the least pixel unit can be executed efficiently.

In the foregoing description, the smoothing processing is carried out in terms of software by use of the CPU 33. However, a similar processing can also be carried out in terms of hardware. Then, description will be given below of a smoothing processing in terms of hardware.

Figure 19A:
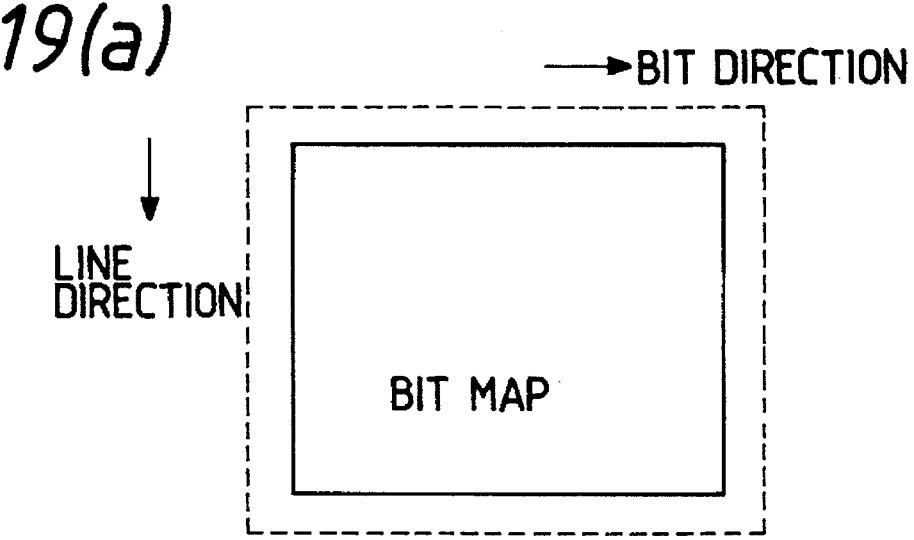
FIGS. 19(a) and 19(b) are explanatory views of how to read out a bit map used when performing a smoothing processing by means of hardware.
Figure 19B:
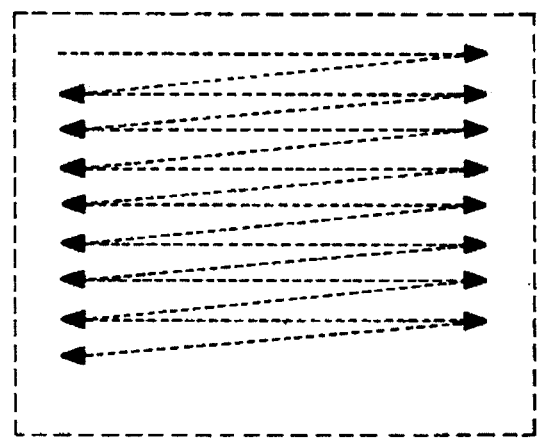
Figure 20:
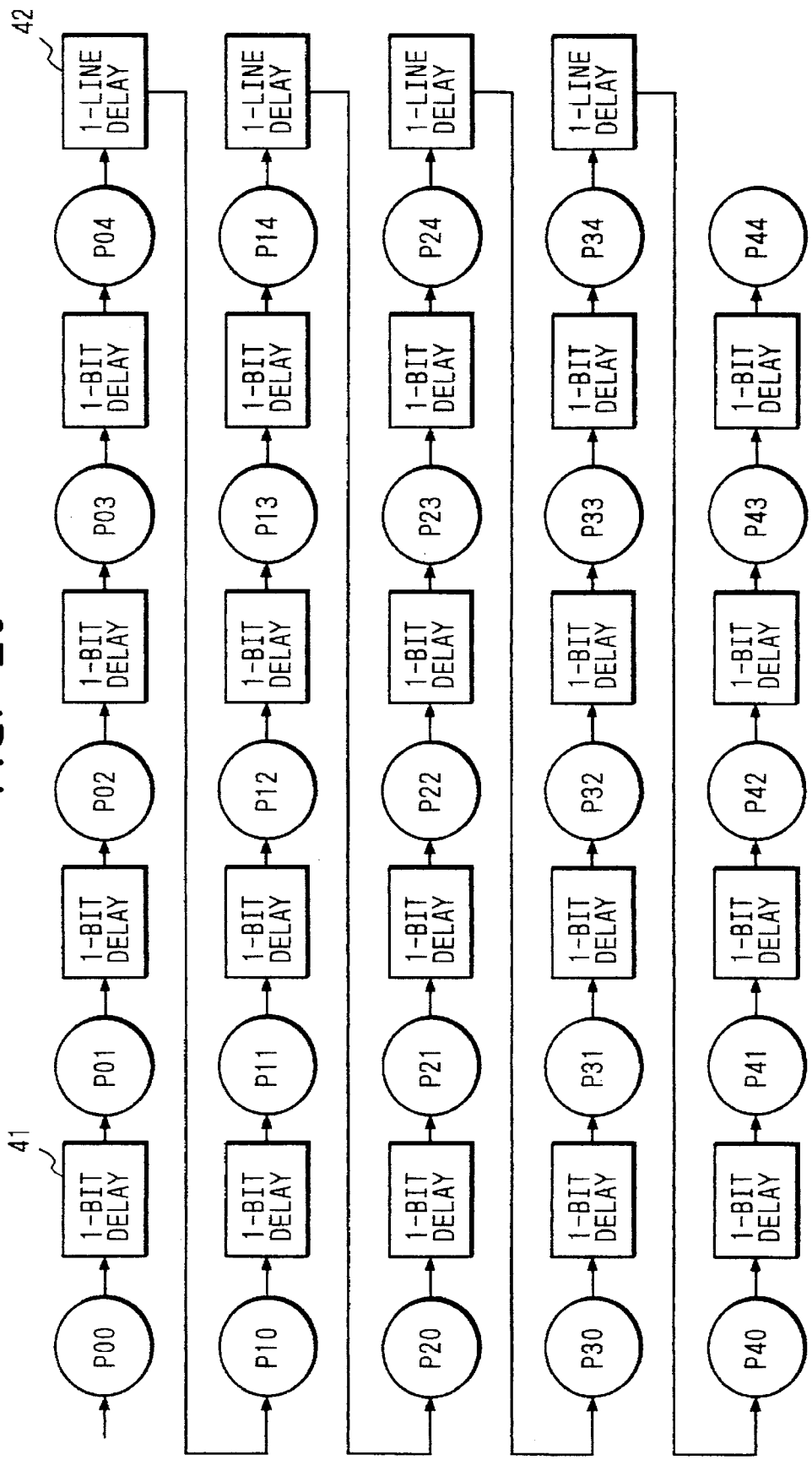
FIG. 20 is a block diagram of delay units in a smoothing device which is used to perform a smoothing processing by means of hardware.
Figure 21:
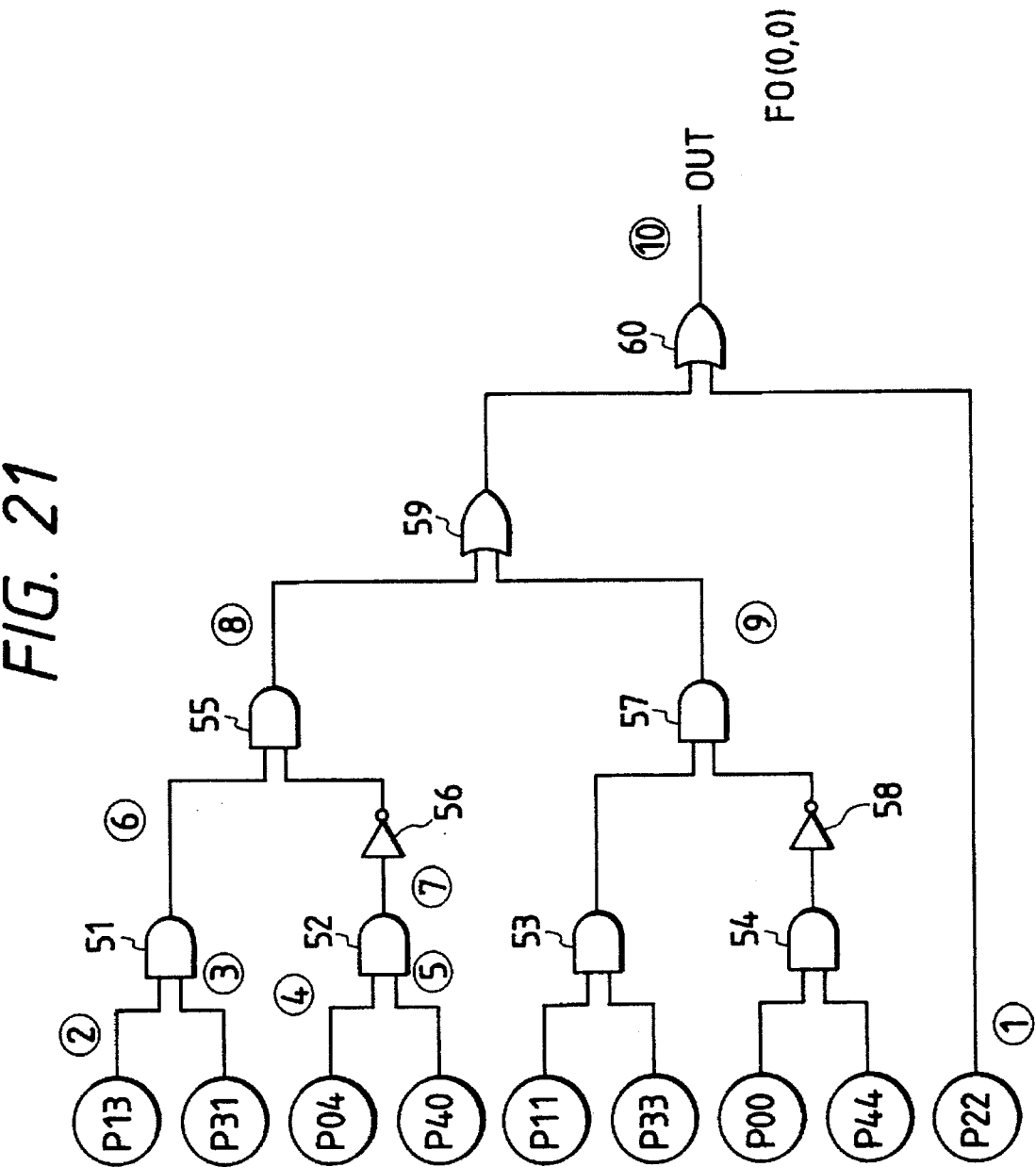
FIG. 21 is a block diagram of a logical operation unit in the smoothing device which is used to perform a smoothing processing by means of hardware.

When a smoothing processing is performed in terms of hardware, the data of a bit map shown in FIG. 19 (a) is scanned bit by bit in a bit direction (main scanning) as shown in FIG. 19 (b) and, when the scanning of 1 line is ended, then scanning is repeated from the first bit of the next line (subsidiary scanning). The bit map is scanned in this manner to thereby obtain image signals. The resultant image signals are then supplied sequentially to a smoothing device which is shown in FIGS. 20 and 21. The smoothing device includes a delay unit shown in FIG. 20 and a logical operation unit shown in FIG. 21. FIGS. 20 and 21 show the hardware structure of a smoothing device adapted to perform a smoothing processing on an enlarged character which is enlarged twice in length and width.

At first, description will be given below of an embodiment of a smoothing device adapted to perform a smoothing processing on an enlarged character which is enlarged twice in length and width in terms of hardware.

The delay unit shown in FIG. 20 includes a plurality of delay elements 41 connected in series to produce a 1 bit period of delay respectively, terminals P00-04, P10-14, P20-24, P30-34, and P40-44 respectively disposed before and after the respective delay elements 41, and 1-line delay elements 42 disposed one for every four 1-bit delay elements 41. In FIG. 20, one line of delay elements arranged horizontally correspond to a 1 line of the bit map and, in the embodiment shown in FIG. 20, five lines of delay elements are shown. Strictly, the 1-line delay element 42 has a delay time of (1-line period minus 4 bit-period) and can provide a 1-line delay period between the mutually adjoining terminals P00, P10, P20, P30 and P40. For this reason, between the mutually adjoining terminals arranged horizontally (that is, in the bit direction), there can be obtained a 1-bit period of delay and, between the mutually adjoining terminals arranged vertically (that is, in the line direction), there can be obtained a 1-line period of delay. The outputs of the predetermined terminals of the above-mentioned terminals are supplied to the logical operation unit which is shown in FIG. 21 and is used to perform a smoothing processing.

In the logical operation unit shown in FIG. 21, the outputs of the terminals P13 and P31 are supplied to an AND circuit 51, the outputs of the terminals P04 and P40 are supplied to an AND circuit 52, the outputs of the terminals P11 and P33 are supplied to an AND circuit 53, and the outputs of the terminals P00 and P44 are supplied to an AND circuit 54. The output of the AND circuit 51 is supplied to one input terminal of an AND circuit 55, and the output of the AND circuit 52 is supplied through an inversion circuit 56 to the other input terminal of the AND circuit 55. Also, the output of the AND circuit 53 is supplied to one input terminal of an AND circuit 57, and the output of the AND circuit 54 is supplied through an inversion circuit 58 to the other input terminal of the AND circuit 57. The outputs of the AND circuits 55 and 57 are supplied to an OR circuit 59, and the output of the OR circuit 59 is supplied to an OR circuit 60 together with the output of the terminal P22. Therefore, if the output of the OR circuit 60 is expressed as FO (0, 0) then the following equation is obtained:

FO (0, 0) =
[P22]
OR
((([P13] AND [P31]) AND NOT ([P04] AND [P40]))
OR
((([P11] AND [P33]) AND NOT ([P00] AND [P44]))).

Here, the output FO (0, 0) is delayed 2 bits and 2 lines with respect to an input F1 (0, 0).

A signal [P22] obtained in the terminal 22 corresponds to the bit map (1) shown in FIG. 7 which has been previously described. Similarly, signals [P13], [P31], [P04] and [P40] respectively obtained in the terminals P13, P31, P04 and P40 correspond to the bit maps (2), (3), (4) and (5), respectively. Also, the outputs of the AND circuit 51, AND circuit 52, AND circuit 55, AND circuit 57 and OR circuit 60 correspond to the bit maps (6), (7), (8), (9), and (a), respectively.

Therefore, in the embodiment shown in FIGS. 20 and 21 as well, similarly to the embodiment that has been previously described, the oblique lines can be smoothed while the right-angled portions are kept as they are.

Next, description will be given below of an embodiment of a smoothing device adapted to perform a smoothing processing in terms of hardware on an enlarged character which has been enlarged three times in length and width. The present smoothing device also includes a delay unit and a logical operation unit. According to the present delay unit, in an matrix composed of 7 lines and 7 dots, P00-66, P33 is used as an attention dot. However, the present delay unit is similar in structure to the delay unit shown in FIG. 20 and, therefore, the description thereof is omitted here and description will be given of only the present logical operation unit.

Figure 22:
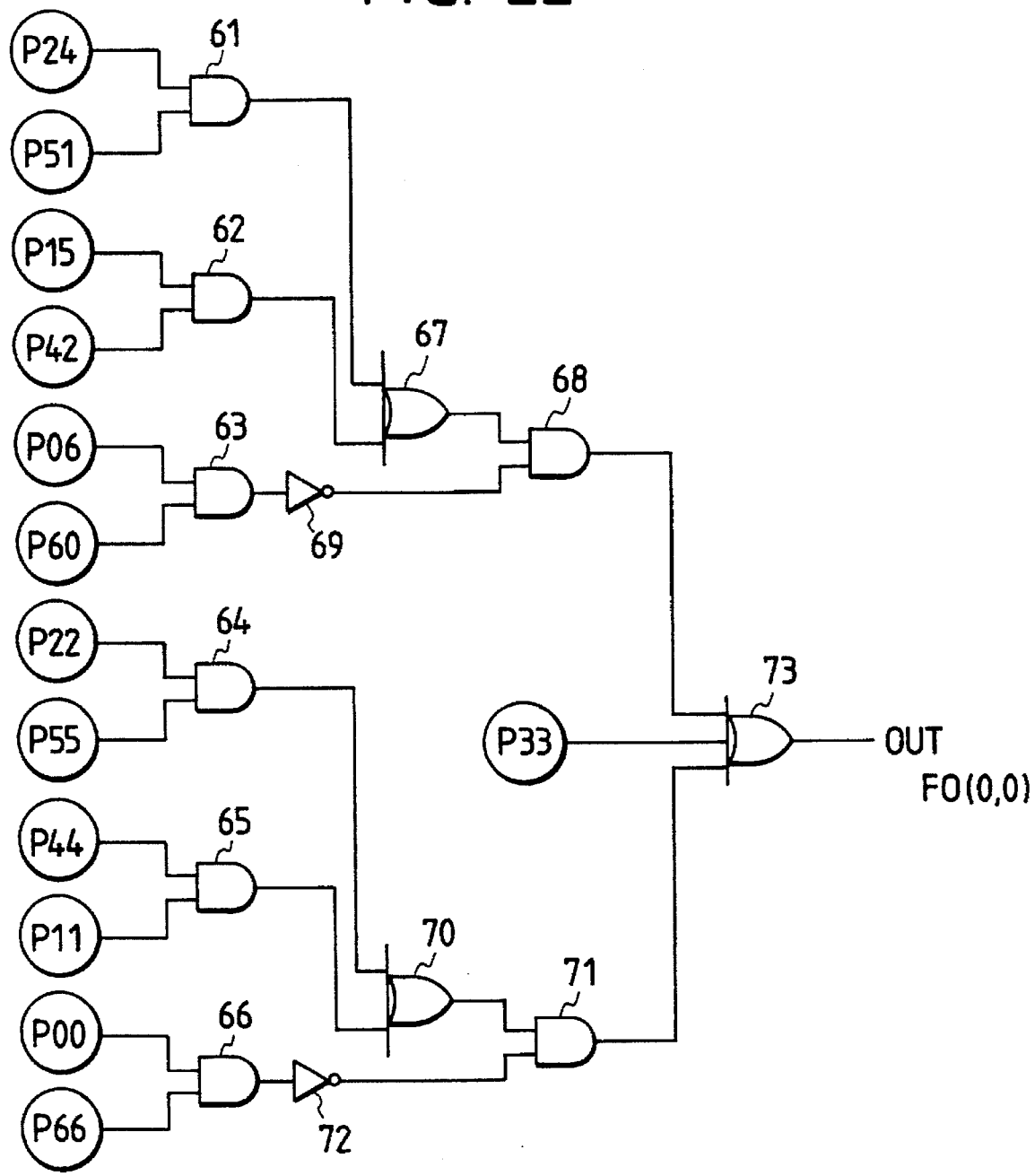
FIG. 22 is a block diagram of a logical operation unit which is used to perform a smoothing processing on an enlarged character enlarged three times in length and width.

In FIG. 22, there is shown a logical operation unit which is used to perform a smoothing processing on an enlarged character which has been enlarged three times in length and width. In particular, the outputs of terminals P24 and P51 are supplied to an AND circuit 61, the outputs of terminals P15 and P42 are supplied to an AND circuit 62, and the outputs of terminals P06 and P60 are supplied to an AND circuit 63. Also, the outputs of terminals P22 and P55 are supplied to an AND circuit 64, the outputs of terminals P44 and P11 are supplied to an AND circuit 65, and the outputs of terminals P00 and P66 are supplied to an AND circuit 66. The respective outputs of AND circuits 61 and 62 are supplied to an OR circuit 67. The output of the OR circuit 67 is supplied to one input terminal of an AND circuit 68, and the output of the AND circuit 63 is supplied through an inversion circuit 69 to the other input terminal of the AND circuit 68. The respective outputs of the AND circuits 64 and 65 are supplied to an OR circuit 70. Further, the output of the OR circuit 70 is supplied to one input terminal of an AND circuit 71, and the output of the AND circuit 66 is supplied through an inversion circuit 72 to the other input terminal of the AND circuit 71. The respective outputs of the AND circuits 68 and 71 are supplied to an OR circuit 73 together with an output from a terminal P33. Therefore, if the output of the OR circuit 73 is expressed as FO (0, 0), then the following equation is obtained:

FO (0, 0) =
[P33]
OR
((([P24] AND [P51]) OR ([P15] AND [P42]))
AND NOT ([P06] AND [P60]))
OR
((([P22] AND [P55]) OR ([P44] AND [P11]))
AND NOT ([P00] AND [P66])).

Here, the output FO (0, 0) is delayed 3 bits and 3 lines with respect to an input F1 (0, 0).

Next, description will be given below of an embodiment of a smoothing device adapted to perform a smoothing processing in terms of hardware on an enlarged character which has been enlarged m times (m≧2) in length and width.

Figure 23:
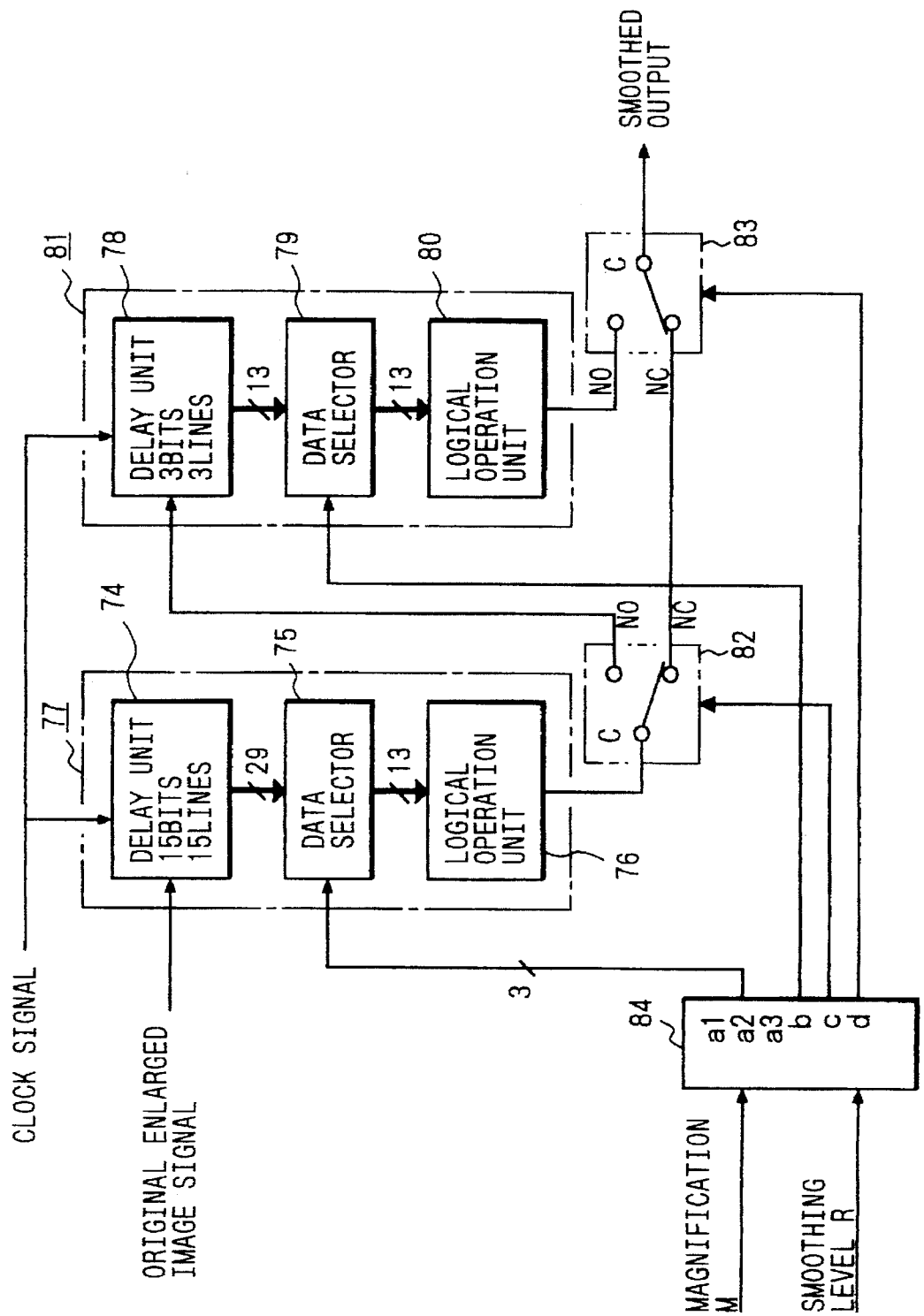
FIG. 23 is a block diagram of circuits employed in a smoothing device used to perform a smoothing processing on an enlarged character which is enlarged up to seven times in length and width.

In FIG. 23, there is shown a smoothing device which performs a smoothing processing on an enlarged character image which has been enlarged up to five times in length and width. The present smoothing device includes a smoothing unit 77, which consists of a delay unit 74, a data selector 75 and a logical operation unit 76, and a smoothing unit 81, which consists of a delay unit 78, a data selector 79 and a logical operation unit 80. The connection states of the two smoothing units 77 and 81 can be switched by means of switches 82 and 83. A decoder 84 is arranged such that, in accordance with the multiple number or magnification M and smoothing level R of an enlarged character image input therein, it feeds signals to the data selectors 75 and 79, and to the switches 82 and 83 respectively to control the operations thereof. The term "smoothing level R" indicates the unit number of dots in which a smoothing operation is carried out, that is, when R=1, the smoothing operation is carried out in 1-dot unit and, when R=2, the smoothing operation is carried out in 2-dot unit.

The delay unit 74 is basically similar in structure to the delay unit shown in FIG. 20 and used to smooth a character enlarged twice in length and width, and includes a matrix which, in the main scanning direction, 7 dots respectively right and left of an attention dot and, in the subsidiary scanning direction, 7 lines respectively above and below the attention dot, that is, a matrix which includes 15 dots×15 lines with an attention dot [0, 0], shown in FIG. 24, as the center thereof. In the matrix shown in FIG. 24, the signals of 29 dots respectively arranged on diagonals and enclosed with heavy lines are given to the data selector 75. Numerals shown in FIG. 24 indicate the relative positions of the dots and lines with respect to the attention dot, respectively.

In FIG. 23, on receipt of 3-bit information on the multiple number (2 to 7) of an enlarged character to be processed from the decoder 84, the data selector 75 selects, from 21 dot signals shown in FIG. 23, the attention dot signal and 13-dot signals respectively having such relations as shown in Table 2 with the attention dot signal and then gives them to the input terminals $P_A$ to $P_M$ (not shown) of the logical operation unit 76, respectively.

TABLE 2

| Magnification in Length and Width | Inputs of Logical Operation Unit 76 | | | | | | |
|---|---|---|---|---|---|---|---|
| | $P_A$ | $P_B$ | $P_C$ | $P_D$ | $P_E$ | $P_F$ | $P_G$ |
| 2 | 0,0 | −1,1 | 1,−1 | −1,1 | 1,−1 | −2,2 | 2,−2 |
| 3 | 0,0 | −2,2 | 1,−1 | −1,1 | 2,−2 | −3,3 | 3,−3 |
| 4 | 0,0 | −2,2 | 2,−2 | −2,2 | 2,−2 | −4,4 | 4,−4 |
| 5 | 0,0 | −3,3 | 2,−2 | −2,2 | 3,−3 | −5,5 | 5,−5 |
| 6 | 0,0 | −3,3 | 3,−3 | −3,3 | 3,−3 | −6,6 | 6,−6 |
| 7 | 0,0 | −4,4 | 3,−3 | −3,3 | 4,−4 | −7,7 | 7,−7 |

| Magnification in Length and Width | Inputs of Logical Operation Unit 76 | | | | | |
|---|---|---|---|---|---|---|
| | $P_H$ | $P_I$ | $P_J$ | $P_K$ | $P_L$ | $P_M$ |
| 2 | 1,1 | −1,−1 | 1,1 | −1,−1 | 2,2 | −2,−2 |
| 3 | 2,2 | −1,−1 | 1,1 | −2,−2 | 3,3 | −3,−3 |
| 4 | 2,2 | −2,−2 | 2,2 | −2,−2 | 4,4 | −4,−4 |
| 5 | 3,3 | −2,−2 | 2,2 | −3,−3 | 5,5 | −5,−5 |
| 6 | 3,3 | −3,−3 | 3,3 | −3,−3 | 6,6 | −6,−6 |
| 7 | 4,4 | −3,−3 | 3,3 | −4,−4 | 7,7 | −7,−7 |

The logical operation unit 76, which is basically similar in structure to the logical operation unit shown in FIG. 22, performs the following logical operation in accordance with 13 input signals [$P_A$] to [$P_M$] respectively from the terminals $P_A$ to $P_M$ to thereby smooth the enlarged character to a size as half as the multiple number:

[$P_A$]
OR
(((([$P_B$] AND [$P_C$]) OR ([$P_D$] AND [$P_E$]))
AND NOT ([$P_F$] AND [$P_G$]))
OR
(((([$P_H$] AND [$P_I$]) OR ([$P_J$] AND [$P_K$]))
AND NOT ([$P_L$] AND [$P_M$])).

Figure 25:
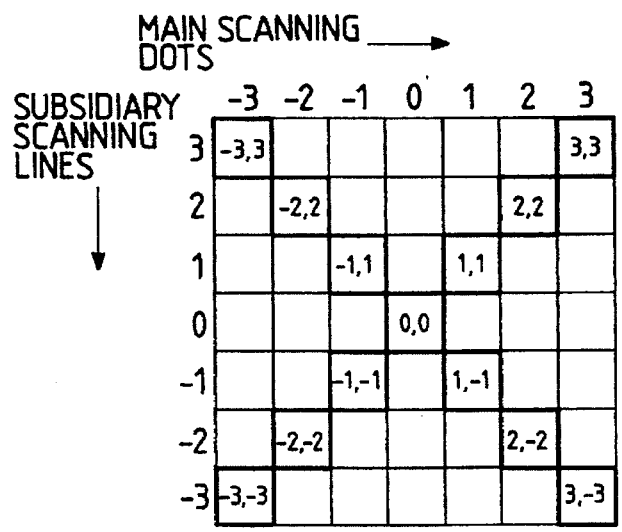
FIG. 25 is a view of dots to be referred to in a dot matrix of a delay unit 78.

Similarly, the delay unit 78 in the next smoothing unit 81 has a matrix which includes three dots respectively right and left of the attention dot in the main scanning direction and three lines respectively above and below of the attention dots in the subsidiary scanning direction, that is, a matrix which includes 7 dots×7 lines with the attention dot [0, 0] shown in FIG. 25 as the center thereof. 13 dot signals, which are respectively arranged on diagonals and enclosed with heavy lines in the matrix shown in FIG. 25, are given to the data selector 79, respectively. On receipt of a 1 bit of information on the multiple number (twice or three times) of the enlarged character to be processed from the decoder 84, the data selector 79 selects, from the 13 dot signals in FIG. 25, the attention dot signals and 13 dot signals which respectively have such relations as shown in Table 3 with the attention dot signal, and then gives these dot signals to the input terminals $P_A$ to $P_M$ (not shown) of the logical operation unit 80, respectively.

TABLE 3

| Magnification in Length and Width | Inputs of Logical Operation Unit 80 | | | | | | |
|---|---|---|---|---|---|---|---|
| | A | B | C | D | E | F | G |
| 2 | 0,0 | −1,1 | 1,−1 | −1,1 | 1,−1 | −2,2 | 2,−2 |
| 3 | 0,0 | −2,2 | 1,−1 | −1,1 | 2,−2 | −3,3 | 3,−3 |

TABLE 3-continued

| Magnification in Length and Width | Inputs of Logical Operation Unit 80 | | | | | |
|---|---|---|---|---|---|---|
| | H | I | J | K | L | M |
| 2 | 1,1 | −1,−1 | 1,1 | −1,−1 | 2,2 | −2,−2 |
| 3 | 2,2 | −1,−1 | 1,1 | −2,−2 | 3,3 | −3,−3 |

The logical operation unit 80, which is the same as the logical operation unit 76 in structure, performs the above-mentioned logical operation in accordance with 13 input signals [$P_A$] to [$P_M$] respectively from the terminals $P_A$ to $P_M$, and thereby smoothes the enlarged character to a size as large as a 1-dot unit.

The switch 82 is adapted to receive the output of the logical operation unit 76. Also, the switch 82, in the off state thereof, outputs the output of the logical operation unit 76 as a smoothing image signal through the switch 83 and, when it is turned on in accordance with the control signal of the decoder 84, it applies the output of the logical operation unit 76 to the delay unit 78 of the smoothing unit 81 disposed downstream. The switch 83 is turned on in accordance with a control signal which is given from the decoder 84 and, in the on state, it outputs an output given from the logical operation unit 80 of the smoothing unit 81 as a smoothing image signal.

The decoder 84 transmits control signals shown in Table 4 to the data selectors 75, 79 and the switches 82, 83 in accordance with a multiple number or magnification M in length and width and a smoothing level R, respectively.

TABLE 4

| Inputs | | Control Outputs | | | | | |
|---|---|---|---|---|---|---|---|
| Magnification | Smoothing Level | a1 | a2 | a3 | b | c | d |
| 2 | 1 or 2 | 0 | 1 | 0 | 0 | 0 | 0 |
| 3 | 1 or 2 | 0 | 1 | 1 | 0 | 0 | 0 |
| 4 | 1 | 1 | 0 | 0 | 0 | 1 | 1 |
| 4 | 2 | 1 | 0 | 0 | 0 | 0 | 0 |
| 5 | 1 | 1 | 0 | 1 | 1 | 1 | 1 |
| 5 | 2 | 1 | 0 | 1 | 0 | 0 | 0 |
| 6 | 1 | 1 | 1 | 0 | 1 | 1 | 1 |
| 6 | 2 | 1 | 1 | 0 | 0 | 0 | 0 |
| 7 | 1 | 1 | 1 | 1 | 1 | 1 | 1 |
| 7 | 2 | 1 | 1 | 1 | 0 | 0 | 0 |

Figure 24:
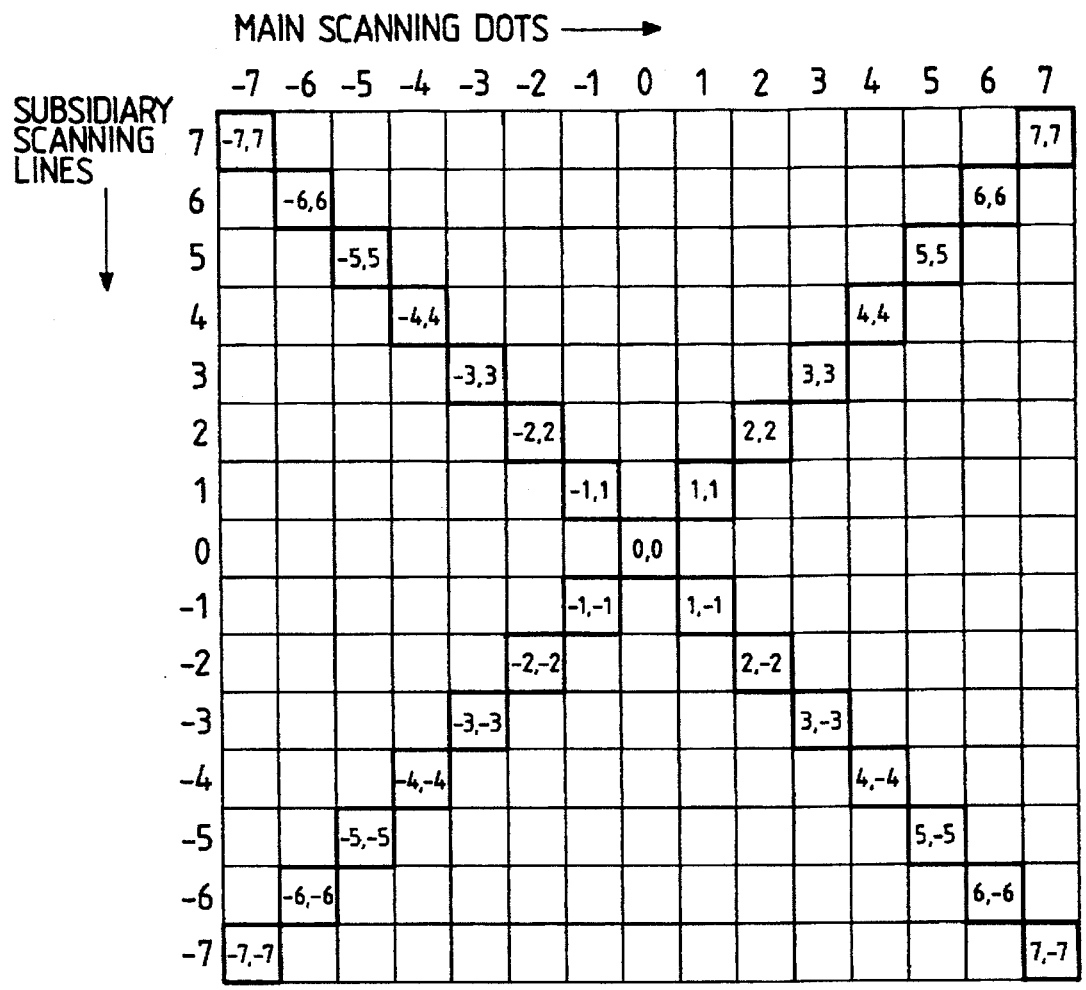
FIG. 24 is a view of dots to be referred to in a dot matrix of a delay unit 74.

For example, to smooth a character which has been enlarged twice in length and width, the logical operation unit 76 selects pixels corresponding to the enlarged character in the matrix shown in FIG. 24, performs the following logical operation, and outputs the results thereof by means of the switches 82 and 83:

[0, 0]
OR
((([−1, 1] AND [1, −1]) OR ([−1, 1] AND [1, −1]))
AND NOT ([−2, 2] AND [2, −2]))
OR
((([1, 1] AND [−1, −1]) OR ([11] AND [−1, −1]))
AND NOT ([2, 2] AND [−2, −2])).

Similarly, for example, when smoothing a character which has been enlarged six times in length and width, the logical operation unit 76 selects pixels corresponding to the enlarge character in the matrix shown in FIG. 24, and performs the following logical operation:

```
    [0, 0]
    OR
    ((([−3, 3] AND [3, −3]) OR ([−3, 3] AND [3, −3]))
    AND NOT ([−6, 6] AND [6, −6]))
    OR
    ((([3, 3] AND [3, −3]) OR ([−3, 3] AND [−3, −3]))
    AND NOT ([6, 6] AND [−6, −6])).
```

If the smoothing level R is 2, that is, the smoothing operation is to be performed in a 2-dot unit, then the results of the above logical operation, as they are, are output by means of the switches 82 and 83.

On the other hand, if the smoothing level R is 1, that is, the smoothing operation must be performed in a 1-dot unit, then the switches 82 and 83 are operated by the control outputs of the decoder to thereby allow the downstream smoothing unit 81 to perform the following logical operation:

```
    [0, 0]
    OR
    ((([−2, 2] AND [1, −1]) OR ([−1, 1] AND [2, −2]))
    AND NOT ([−3, 3] AND [3, −3]))
    OR
    ((([2, 2] AND [−1, −1]) OR ([1, 1] AND [−2, −2]))
    AND NOT ([3, 3] AND [−3, −3])).
```

After then, the output of the logical unit 81 is taken out by use of the switch 83.

As described above, by cascade connecting N (N is a number which satisfies the condition that M≦2(N+1)−1) pieces of smoothing units with respect to a character enlarged by a multiple number or magnification M (which is an arbitrary number and is equal to 2 or more), the smoothing processing to a 1-dot unit can be performed efficiently. Also, by providing (N−1) pieces of switches and allowing the switches to take out the outputs of the respective smoothing units selectively according to cases, a signal of a desired level can be obtained. Further, by cascade connecting the respective smoothing units and also by providing a single switch which can input therein the outputs of the respective smoothing units as well as can select and output the output of one of the smoothing units, the embodiment can use only the single switch.

In the embodiment shown in FIG. 23, due to the fact that the attention dot is fixed to [0, 0], the smoothing signals from the smoothing device 77 are always output being delayed by 7 lines and 7 dots. However, the attention dot may be changed according to a multiple number for enlargement in length and width. For example, in the case of the multiple number of 2 in length and width, if [−3, 3] is specified as the attention dot in the matrix shown in FIG. 24 and the data selector 75 is used to select 9 dots on the diagonals with the attention dot as the center thereof and to apply the selected 9 dots to the logical operation unit 76, then the smoothing signals thereof can be output delayed only by 3 lines and 3 dots. That is, the amount of delay can be reduced accordingly.

Figure 26:
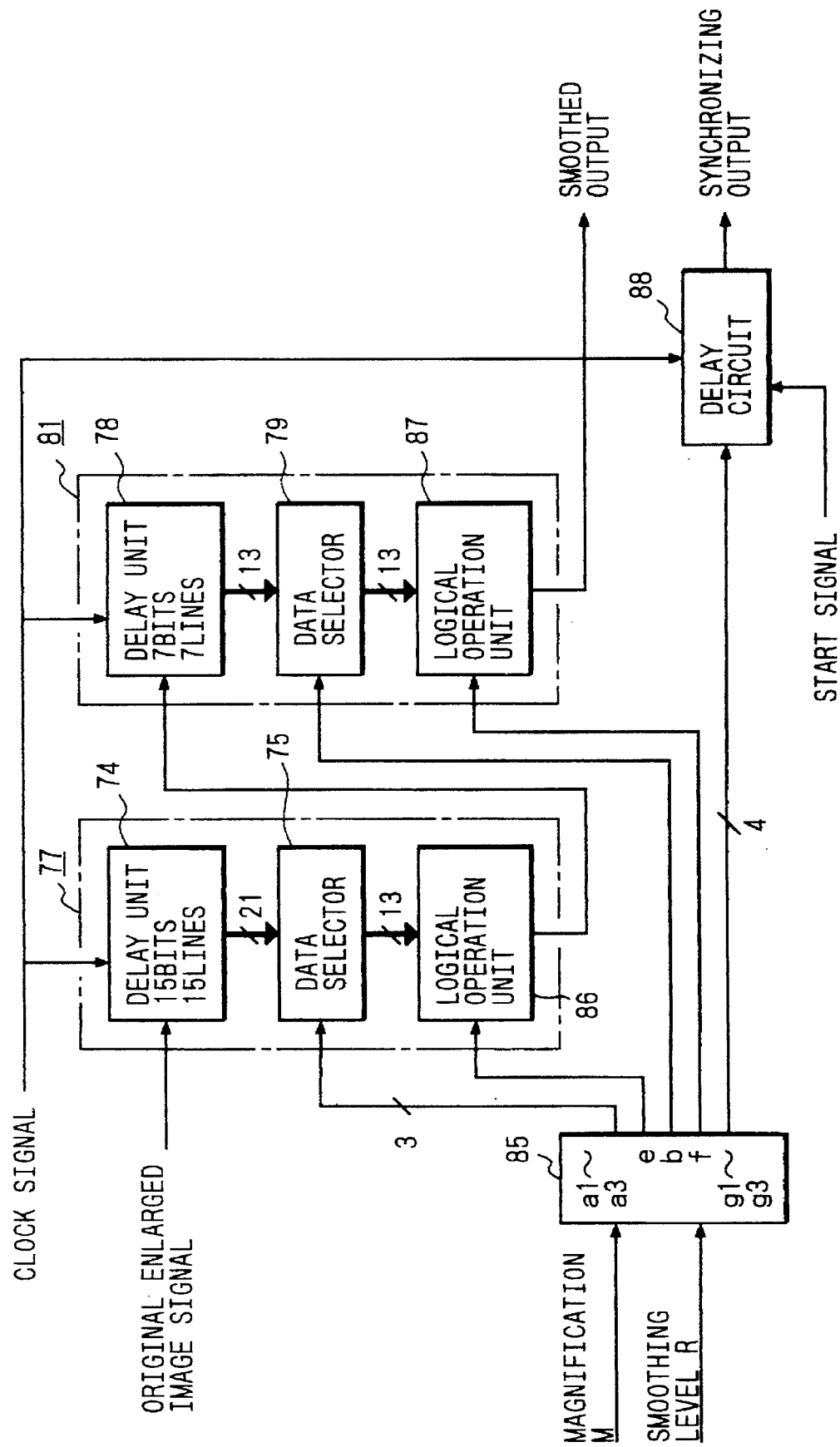
FIG. 26 is a block diagram of circuits employed in another smoothing device which is used to perform a smoothing processing on an enlarged character up to seven times in length and width.

Now, in FIG. 26, there is shown another embodiment according to the invention, in which a logical operation unit 86 is basically similar in structure to the logical operation unit shown in FIG. 22 and, in accordance with a processing prohibition signal e from a decoder 850, performs the following logical operation:

```
    [0 0]
    OR
    (e AND (((([P_B] AND [P_C]) OR ([P_D] AND [P_E])) AND
    NOT ([P_F] AND [P_G])) OR ((([P_H] AND [P_I]) OR ([P_J] AND [P_K]))
    AND NOT ([P_L]) AND [P_M]))).
```

A logical operation unit 87 is the same as the logical operation unit 86 in structure and, when it does not perform a smoothing operation, it simply outputs the signal of the attention signal. To realize the logical operation, for example, as shown in FIG. 27, the processing prohibition signal e may be input to AND circuit 68 and 71. Due to this structure, there is eliminated the need for provision of the above-mentioned switch which is used to switch the output according to the degree of smoothing, and also the amount of delay of the smoothing signal can always be set at a fixed level (that is, 10 lines and 10 dots) regardless of the multiple number M. Therefore, for example, there may be provided a delay circuit 88 using a shift register or a counter and fixed data may be given according to the amount of delay from the delay circuit 88, so that a signal for synchronization can be taken out. Further, whether a smoothing operation is performed by the logical operation unit 87 or not is controlled by a signal f from the decoder 85, and the amount of delay in the delay circuit 88 is controlled by 3-bit signals g1 to g3 from the decoder 85.

The above-mentioned delay circuit 88 can also be applied to the embodiment shown in FIG. 23. When variable data on the amount of output delay are given to it from the decoder 84, then the delay circuit 88 can produce a synchronization output according to the output delay data. Due to this, even if the amount of output delay is varied, a smoothed signal can be processed with ease. Also, in the embodiment shown in FIG. 26, the smoothing processings of the characters enlarged twice and three times in length and width can be performed by either of the upstream and downstream smoothing units. However, if the smoothing processings are performed by the downstream smoothing unit 81, then there is eliminated the input only necessary to process the characters enlarged twice and three times in length and width in the upstream logical operation unit 86, thereby reducing the necessary dots to 17 dots. In this case, the upstream logical operation unit 86 performs a smoothing operation on the characters which have been enlarged four times to seven times in length and width. In other words, as described above, the multiple numbers to be processed are allocated to the smoothing units sequentially starting at the final-stage smoothing unit, that is, the N-th smoothing unit from the final smoothing unit processes a multiple number which is an integral number k satisfying the condition that 2N≦k<2(N+1), whereby the structure of the present embodiment can be simplified.

On the other hand, although not shown, in the embodiment shown in FIG. 23, after the output from the logical operation unit 76 of the smoothing unit 77 is taken out as it is and is once stored in a memory, and all of the original enlarged image signals are processed, a smoothing signal may be taken out from the memory and may be applied again to the smoothing unit 77 together with a control signal to be newly applied to the data selector, thereby achieving the smoothing processing. In this case, although there is required a new memory and the real-time output cannot be expected, only one smoothing unit is necessary and other switches are not necessary, so that the simplest structure can be provided.

In the above-mentioned embodiments, the smoothing of the right-angled portions is prohibited but, when it is not necessary to keep the right-angled portions, for example, when the present invention is applied in smoothing a figure image, the right-angled portions can also be smoothed.

As has been described heretofore, according to the invention, due to the fact that the image information only on the enlarged character is used to thereby perform a uniform processing, a smoothing processing can be performed highly efficiently and a time necessary for the smoothing processing can be reduced. Further, since the processing can be simplified, a smoothing device can be structured by hardware with ease and the smoothing device of the invention can be connected to a character generator to thereby allow the smoothing processing to be executed real time. Also, the smoothing processing can be performed while the right-angled portion is kept as it is. Furthermore, because the oblique line portions are smoothed according to an even or odd multiple number of the enlarged character, a natural smoothing operation can be achieved. In addition, due to the fact that only the enlarged characters are used and processed uniformly, the character that has been enlarged by a large multiple number can be smoothed recurrently and a natural smoothing processing can be performed for a short processing time.

What is claimed is:

1. A method for operating an image processor to smooth an enlarged image, comprising the steps of:

inputting an original enlarged image obtained by enlarging an original image m times (m is an integral number which satisfies the condition that m≧2) in main and subsidiary scanning directions;

moving said original enlarged image in a first direction along an inclined line formed by connecting adjoining pixels with one another to thereby generate a first image;

moving said original enlarged image in a second direction opposite to said first direction along said inclined line to thereby generate a second image;

performing an AND operation between said first and second images; and performing an OR operation between an image resulting from said AND operation and said original enlarged image.

2. A method for operating an image processor to smooth an original enlarged character image by adding a smoothing image to said original enlarged character image obtained by enlarging an original character image m times (m is an integral number which satisfies the condition that m>2) in main and subsidiary scanning directions, comprising the steps of:

selecting image information on an attention pixel from said original enlarged character image;

moving said original enlarged character image in a first direction along an inclined line formed by connecting adjoining pixels with one another to thereby generate a first image;

moving said original enlarged character image in a second direction opposite to said first direction along said inclined line to thereby generate a second image;

performing an AND operation between said first and second images to thereby find an interpolation image;

moving said original enlarged character image by a distance corresponding to m pixels in said first direction along said inclined line to thereby generate a third image;

moving said original enlarged character image by the distance corresponding to m pixels in said second direction along said inclined line to thereby generate a fourth image;

performing an AND operation between said third and fourth images to thereby find a non-interpolation image; and performing an OR operation between said interpolation image excluding said non-interpolation image and said original enlarged character image to thereby find a final interpolation image.

3. A method for operating an image processor to smooth an enlarged character image, comprising the steps of:

inputting an original enlarged character image obtained by enlarging an original character image m times (m is an integral number which satisfies the condition that m≧2) in main and subsidiary scanning directions;

moving said original enlarged character image upward to the right by a distance corresponding to n1 pixels (n1 is an integral number which satisfies the condition that 1≦n1<m) respectively in said main and subsidiary scanning directions to thereby generate a first image;

moving said original enlarged character image downward to the left by a distance corresponding to n2 pixels (n2 is an integral number which satisfies the condition that 1≦n2<m) respectively in said main and subsidiary scanning directions to thereby generate a second image;

moving said original enlarged character image upward to the left by a distance corresponding to n3 pixels (n3 is an integral number which satisfies the condition that 1≦n3<m) respectively in said main and subsidiary scanning directions to thereby generate a third image;

moving said original enlarged character image downward to the right by a distance corresponding to n4 pixels (n4 is an integral number which satisfies the condition that 1≦n4<m) respectively in said main and subsidiary scanning directions to thereby generate a fourth image;

performing an AND operation between said first and second images to thereby generate a fifth image;

performing an AND operation between said third and fourth images to thereby generate a sixth image; and performing an OR operation between said fifth image, said sixth image and said original enlarged character image.

4. A method for operating an image processor to smooth an enlarged character image, comprising the steps of:

enlarging an original character image m times (m is an integral number which satisfies the condition that m≧2) in main and subsidiary scanning directions to thereby generate an original enlarged character image;

moving said original enlarged character image upward to the right, downward to the left, upward to the left and downward to the right respectively by a distance corresponding to m pixels in said main and subsidiary scanning directions to thereby generate first, second, third and fourth images;

performing an AND operation between said first and second images to thereby generate fifth image;

performing an AND operation between said third and fourth image to thereby generate a sixth image; and prohibiting a portion of said original enlarged character image belonging to either said fifth or sixth image from being smoothed.

5. A device for smoothing an enlarged image, comprising:

means for inputting an original enlarged image obtained by enlarging an original image m times (m is an integral number which satisfies the condition that m≧2) in main and subsidiary scanning directions;

means for moving said original enlarged image in a first direction along an inclined line formed by connecting adjoining pixels to one another to thereby generate a first image;

means for moving said original enlarged image along said inclined line in a second direction opposite to said first direction to thereby generate a second image;

means for performing an AND operation between said first and second images to thereby find an interpolation image; and smoothing means for performing an OR operation between said interpolation image and said original enlarged image.

6. A device for smoothing an original enlarged character image by adding a smoothing image to said original enlarged character image obtained by enlarging an original character image m times (m is an integral number which satisfies the condition that m≧2) in main and subsidiary scanning directions, said smoothing device comprising:

first generating means for selecting image information on an attention pixel from said original enlarged character image and for moving said original enlarged character image in a first direction along an inclined line formed by connecting adjoining pixels to thereby generate a first image;

second generating means for moving said original enlarged character image along said inclined line in a second direction opposite to said first direction to thereby generate a second image;

means for performing an AND operation between said first and second images to thereby find an interpolation image;

third generating means for moving said original enlarged character image by a distance corresponding to m pixels in said first direction along said inclined line to thereby generate a third image;

fourth generating means for moving said original enlarged character image by the distance corresponding to m pixels along said inclined line in said second direction to thereby generate a fourth image;

means for performing an AND operation between said third image and fourth image to thereby find a non-interpolation image; and smoothing means for performing an OR operation between said interpolation pixel excluding said non-interpolation image and said original enlarged character image to thereby find a final interpolation image.

7. A device for smoothing an original enlarged character image by adding a smoothing image to said original enlarged character image obtained by enlarging an original character image m times (m is an integral number which satisfies the condition that m≧2) in main and subsidiary scanning directions, said smoothing device comprising:

extraction means for selecting image information P (x, y) (x and y are coordinates) on an attention pixel sequentially from said original enlarged character image and for extracting the following respective pieces of pixel information on peripheral pixels respectively distant by given pixels from said attention pixel in said main and subsidiary scanning directions, P (x+n1, y−n1), P (x−n2, y+n2), P (x+n3, y+n3), and P (x−n4, y−n4) (n1, n2, n3, and n4 are respectively integral numbers which satisfy the condition that 1≦n1, n2, n3, n4<m); and logical operation means, in accordance with said respective pieces of said respective pixels extracted by said extraction means, for performing the following logical operation, $$S(x,y) = P(x,y) + P(x+n1,y-n1) \cdot P(x-n2,y+n2) +$$
$$P(x+n3,y+n3) \cdot P(x-n4,y-n4)$$

to thereby find a signal S (x, y) of a smoothing image.

8. A device for smoothing an original enlarged character image by adding a smoothing image to said original enlarged character image obtained by enlarging an original character image m times (m is an integral number which satisfies the condition that m≧2) in main and subsidiary scanning directions, said smoothing device comprising:

extraction means for selecting image information P (x, y) (x and y are coordinates) on an attention pixel sequentially from said original enlarged character image and for extracting the following respective pieces of pixel information on peripheral pixels respectively distant by given pixels from said attention pixel in said main and subsidiary scanning directions, P (x+n1, y−n1), P (x−n2, y+n2), P (x+n3, y+n3), P (x−n4, y−n4), P (x+m, y−m), P (x−m, y+m), P (x+m, y+m), and P (x−m, y−m), (n1, n2, n3, and n4 are respectively integral numbers which satisfy the condition that 1≦n1, n2, n3, n4<m); and logical operation means, in accordance with said respective pieces of said respective pixels extracted by said extraction means, for performing the following logical operation, $$S(x,y) = P(x,y) + P(x+n1,y-n1) \cdot P(x-n2,y+n2) \cdot$$
$$\overline{(P(x+m,y-m) \cdot P(x-m,y+m))} + P(x+n3,y+n3) \cdot$$
$$P(x-n4,y-n4) \cdot \overline{(P(x+m,y+m) \cdot P(x-m,y-m))}$$

to thereby find a smoothing image signal S (x, y).

9. A device for smoothing an original enlarged character image by adding a smoothing image to said original enlarged character image obtained by enlarging an original character image m times (m is an integral number which satisfies the condition that m≧2) in main and sub scanning directions, said smoothing device comprising:

extraction means for selecting image information P (x, y) (x and y are coordinates) on an attention pixel sequentially from said original enlarged character image and for extracting the following respective pieces of pixel information on peripheral pixels respectively distant by n pixels and (n+k) pixels (n is an integral number which satisfies the condition that m−1≦2n≦m, and k=m−2n) from said attention pixel in said main and sub scanning directions, P (x+n, y−n), P (x−n, y+n), P (x+n, y+n),
P (x−n, y−n),
P (x+(n+k), y−(n+k)),
P (x−(n+k), y+(n+k)),
P (x+(n+k), y+(n+k)), and
P (x−(n+k), y−(n+k)); and logical operation means, in accordance with said respective pieces of image information on said respective pixels extracted by said extraction means, for performing the following logical operation, $S(x,y) = P(x,y) + P(x+n,y-n) \cdot P(x-(n+k),y+(n+k)) +$ $P(x+(n+k),y-(n+k)) \cdot P(x-n,y+n) + P(x+n,y+n) \cdot$ $P(x-(n+k),y-(n+k)) + P(x+(n+k),y+(n+k)) \cdot P(x-n,y-n)$ to thereby find a smoothing image signal S (x, y).

10. A device for smoothing an original enlarged character image by adding a smoothing image to said original enlarged character image obtained by enlarging an original character image m times (m is an integral number which satisfies the condition that m≧2) in main and sub scanning directions, said smoothing device comprising first smoothing means and second smoothing means, said first smoothing means comprising:

first extraction means for selecting image information P (x, y) (x and y are coordinates) on an attention pixel sequentially from said original enlarged character image and for extracting the following respective pieces of pixel information on peripheral pixels respectively distant by a pixels and (a+k) pixels (a is an integral number which satisfies the condition that m−1≦2a≦m, and k=m−2a) from said attention pixel in said main and sub scanning directions, P (x+a, y−a),
P (x−a, y+a),
P (x+a, y+a),
P (x−a, y−a),
P (x+(a+k), y−(a+k)),
P (x−(a+k), y+(a+k)),
P (x+(a+k), y+(a+k)), and
P (x−(a+k), y−(a+k)); and first logical operation means, in accordance with said respective pieces of image information on said respective pixels extracted by said first extraction means, for performing the following logical operation, $S(x,y) = P(x,y) + P(x+a,y-a) \cdot P(x-(a+k),y+(a+k)) +$ $P(x+(a+k),y-(a+k)) \cdot P(x-a,y+a) + P(x+a,y+a) \cdot$ $P(x-(a+k),y-(a+k)) + P(x+(a+k),y+(a+k)) \cdot P(x-a,y-a)$ to thereby find a first smoothing image signal S (x, y), and said second smoothing means comprising:

second extraction means for selecting image information S (x, y) on an attention pixel sequentially from said first smoothing image and for extracting the following respective pieces of pixel information on peripheral pixels respectively distant by b pixels and (b+j) pixels (b is an integral number which satisfies the condition that a−1≦2b≦a, and j=a−2b) from said attention pixel in said main and sub scanning directions, S (x+b, y−b),
S (x−b, y+b),
S (x+b, y+b),
S (x−b, y−b),
S (x+(b+j), y−(b+j)),
S (x−(b+j), y+(b+j)),
S (x+(b+j), y+(b+j)), and
S (x−(b+j), y−(b+j)); and second logical operation means, in accordance with said respective pieces of image information on said respective pixels extracted by said second extraction means, for performing the following logical operation, $T(x,y) = S(x,y) + S(x+b,y-b) \cdot S(x-(b+j),y+(b+j)) +$ $S(x+(b+j),y-(b+j)) \cdot S(x-b,y+b) + S(x+b,y+b) \cdot$ $S(x-(b+j),y-(b+j)) + S(x+(b+j),y+(b+j)) \cdot S(x-b,y-b)$ to thereby find a second smoothing image signal T (x, y).

* * * * *

UNITED STATES PATENT AND TRADEMARK OFFICE
CERTIFICATE OF CORRECTION

PATENT NO. : 5,649,034
DATED : July 15, 1997
INVENTOR(S) : Kenichi SONOBE

It is certified that error appears in the above-indentified patent and that said Letters Patent is hereby corrected as shown below:

Claim 2, column 15, line 47, "m > 2" should read --$m \geq 2$--.

Claim 7, column 18, line 1, after "$y-n^4$)", insert a line break.

Signed and Sealed this

Fourteenth Day of July, 1998

BRUCE LEHMAN

*Attest:*

*Attesting Officer*   Commissioner of Patents and Trademarks